United States Patent
Andrei

(12) United States Patent     (10) Patent No.: US 6,801,905 B2
Andrei     (45) Date of Patent: Oct. 5, 2004

(54) DATABASE SYSTEM PROVIDING METHODOLOGY FOR PROPERTY ENFORCEMENT

(75) Inventor: Mihnea Andrei, Paris (FR)

(73) Assignee: Sybase, Inc., Dublin, CA (US)

( * ) Notice: Subject to any disclaimer, the term of this patent is extended or adjusted under 35 U.S.C. 154(b) by 144 days.

(21) Appl. No.: 10/283,660

(22) Filed: Oct. 30, 2002

(65) Prior Publication Data

US 2003/0172059 A1 Sep. 11, 2003

Related U.S. Application Data

(60) Provisional application No. 60/362,523, filed on Mar. 6, 2002.

(51) Int. Cl.[7] .............................................. G06F 17/30
(52) U.S. Cl. ................... 707/2; 707/3; 707/4
(58) Field of Search ............................. 707/1, 2, 3, 4, 707/5, 6, 7, 8, 9, 10, 101, 102, 103, 104.1, 700

(56) References Cited

U.S. PATENT DOCUMENTS

| | | | | |
|---|---|---|---|---|
| 5,600,831 A | * | 2/1997 | Levy et al. ..................... | 707/2 |
| 5,956,706 A | * | 9/1999 | Carey et al. ................... | 707/2 |
| 6,081,801 A | * | 6/2000 | Cochrane et al. .............. | 707/3 |
| 6,356,889 B1 | * | 3/2002 | Lohman et al. ................ | 707/2 |
| 6,665,663 B2 | * | 12/2003 | Lindsay et al. ................ | 707/4 |

OTHER PUBLICATIONS

Andrei, et al, User–Optimizer Communication using Abstract Plans in Sybase ASE, Proceedings of the 27th VLDB Conference, Rome, Italy 2001.

Shapiro, L., et al, Exploiting Upper and Lower Bounds In Top–Down Query Optimization, IDEAS 2001: Proceedings of International Database Engineering and Applications Symposium, pp. 20–33, Jul. 2001.

Galindo–Legaria, C., et al, Orthogonal Optimization of Subqueries and Aggregation, ACM SIGMOD, May 21–24, 2001.

Claussen, J., et al, Exploiting early sorting and early partitioning for decision support query processing, The VLDB Journal, vol. 9(3), pp. 190–213, Dec., 2000.

Graefe, G., The Value of Merge–Join and Hash–Join in SQL Server, Proceedings of the 25th VLDB Conference, pp. 250–253, 1999.

Graefe, G., et al, Hash Joins and Hash Teams in Microsoft SQL Server, VLDB' 98: Proceedings of 24rd International Conference on Very Large Data Bases, Aug., 1998.

Xu, Y., Efficiency in the Colombia Database Query Optimizer, M.S. Thesis, Portland State University, 1998.

Pellenkoft, A., et al, The Complexity of Transformation–Based Join Enumeration, VLDB' 97, Proceedings of 23rd International Conference on Very Large Data Bases, pp. 306–331, Aug., 1997.

(List continued on next page.)

Primary Examiner—Diane D. Mizrahi
Assistant Examiner—Yicun Wu
(74) Attorney, Agent, or Firm—John A. Smart; G. Mack Riddle

(57) ABSTRACT

A database system providing methods for eager and opportunistic property enforcement is described. Plan fragments are generated for obtaining data requested by a query. Plan fragments are grouped together in classes based upon tables of the database covered by each plan fragment. For each class, a particular plan fragment having the lowest execution costs for obtaining the data requested by the query is determined. If grouping is not required at a given class, an operator enforcing ordering is added to this particular sub-plan. However, if grouping is required at the given class, an operator enforcing both grouping and ordering is added to this sub-plan.

43 Claims, 13 Drawing Sheets

OTHER PUBLICATIONS

Simmen, D., et al, Fundamental Techniques for Order Optimization, Proceedings of the 1996 ACM SIGMOD International Conference on Management of Data, pp. 57–67, Jun., 1996.

Vance, B., et al, Rapid Bushy Join–order Optimization with Cartesian Products, Proceedings of the 1996 ACM SIGMOD International Conference on Management of Data, pp. 35–46, Jun. 1996.

Goel, P., et al, SQL Query Optimization: Reordering for a General Class of Queries, SIGMOD Conference, pp. 47–56, Jun., 1996.

Chaudhuri, S., et al, Optimizing Queries with Aggregate Views, International Conference on Extending Database Technology (EDBT), pp. 167–182, Mar. 1996.

Gupta, A., et al, Aggregate–Query Processing in Data Warehousing Environments, VLDB' 95, Proceedings of 21th International Conference on Very Large Data Bases, Sep., 1995.

Yan, W., et al, Eager Aggregation and Lazy Aggregation, VLDB' 95, Proceedings of 21th International Conference on Very Large Data Bases, pp. 345–357, Sept., 1995.

Graefe, G., The Cascades Framework for Query Optimization, Data Engineering Bulletin 18 (3): 19–29, 1995.

Yan, W., et al, Data reduction through early grouping, Proceedings of the 1994 IBM CAS Conference, pp. 227–235, Nov. 1994.

Graefe, G., Volcan—An Extensible and Parallel Query Evaluation System, IEEE Transactions on Knowledge and Data Engineering, vol. 6, No. 1, Feb., 1994.

Lanzelotte, R., et al, On the Effectiveness of Optimization Search Strategies for Parallel Execution Spaces, Proceedings of 19th International Conference on Very Large Data Bases, Aug., 1993.

Graefe, G., et al., The Volcano Optimizer Generator: Extensibility and Efficient Search, IEEE Conf. on Data Eng., pp. 209, Apr. 1993.

Ioannidis, Y., et al, Left–Deep vs. Bushy Trees: An Analysis of Strategy Spaces and its Implications for Query Optimization, Proceedings of the 1991 ACM SIGMOD International Conference on Management of Data, pp. 168–177, May, 1991.

Ono, K., et al, Measuring the Complexity of Join Enumeration in Query Optimization, Proceedings of 16th International Conference on Very Large Data Bases, pp. 314–325, Aug., 1990.

Lohman, G., Grammer–like Functional Rules for Representing Query Optimization Alternatives, Proceedings of the 1988 ACM SIGMOD International Conference on Management of Data, pp. 18–27, Jun., 1988.

Graefe, G., et al, The EXODUS Optimizer Generator, Proceedings of the 1987 SIGMOD Conference, May, 1987.

Bitton, D., et al, Duplicate Record Elimination in Large Data Files, ACM Transactions on Database Systems, vol. 8, No. 2, pp. 255–265, Jun. 1983.

Selinger, P., et al, Access Path Selection in a Relational Database Management System, Proceedings of the 1979 ACM SIGMOD International Conference on Management of Data, pp. 23–34, May 1979.

* cited by examiner

LOGICAL PROPERTIES

| Equivalence Class (Eqc) | {c} | {o} | {l} | {c,o} | {c,o,l} |
|---|---|---|---|---|---|
| available attributes | $c_i$ | $o_j$ | $l_k$ | $c_i, o_k$ | $c_i, o_j, l_k$ |
| projected attributes | c1 | o1,o2,o3,o4 | l2,l3 | o1,o3,o4 | o3,o4,l2,l3 |
| applied predicates | p3 | p4 | p5 | p1,p3,p4 | all |
| predicates to apply | p1,p2,p4,p5 | p1,p2,p3,p5 | p1,p2,p3,p4 | p2,p5 | none |
| equi-joins to apply | p1,p2 | p1,p2 | p1,p2 | p2 | none |
| max useful ordering | c1 | o1,o2,o3,o4 | l2 | o1,o3,o4 | s_l3,o3 |
| grouping columns | none | o1,o2,o3,o4 | l2 | o1,o3,o4 | l2,o3,o4 |
| aggregation functs | none | c_o=count(*) | s_l=sum(l3) | c_co= sum(c_o) | s_l3= sum (s_l*c_o) |
| aggregation complete | no | no | no | no | yes |

FIG. 5

SEARCH ENGINE TYPES
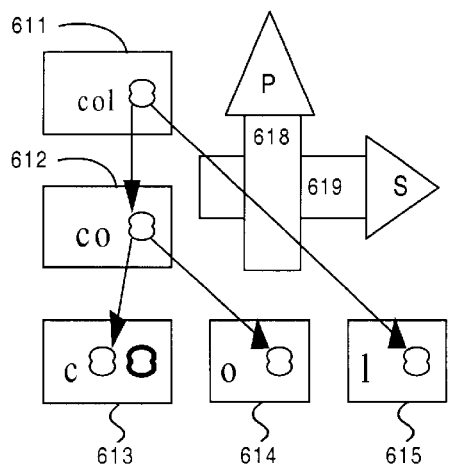
DEPTH-FIRST, BOTTOM-UP
610
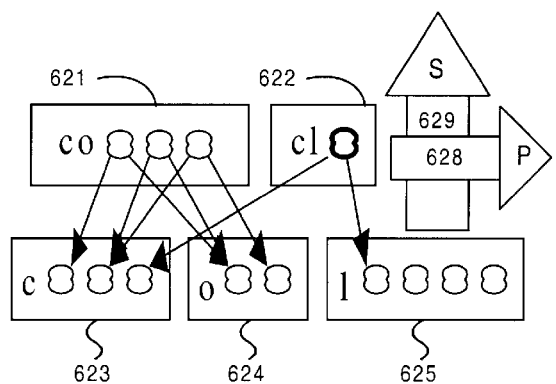
BREADTH-FIRST, BOTTOM-UP
620
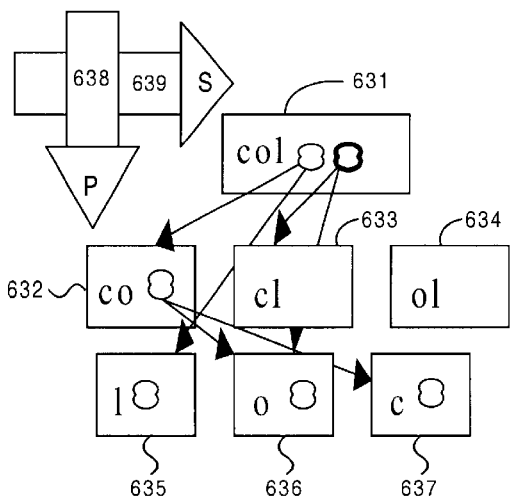
DEPTH-FIRST, TOP-DOWN
630
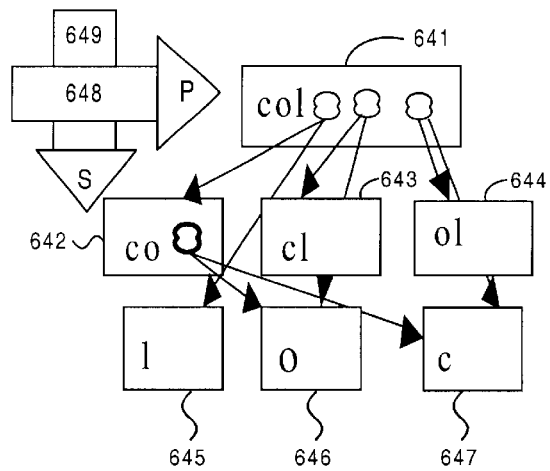
BREADTH-FIRST, TOP-DOWN
640
FIG. 6

THE ABSTRACT PLAN

```
(sort
    (group_ordered
        (nl_join
            (group_sorting
                (m_join
                    (i_scan ic12 c)
                    (group_ordered
                        (i_scan io2134 o)
                    )
                )
            )
            (scalar_agg
                i_scan il234 l)
            )
        )
    )
)
```

*FIG. 11*

DATABASE SYSTEM PROVIDING METHODOLOGY FOR PROPERTY ENFORCEMENT

RELATED APPLICATIONS

The present application is related to and claims the benefit of priority of the following commonly-owned provisional application(s): application Ser. No. 60/362,523 (Docket No. SYB/0086.00), filed Mar. 6, 2002, entitled "Database System Providing Methodology for Eager and Opportunistic Property Enforcement", of which the present application is a non-provisional application thereof. The disclosure of the foregoing application is hereby incorporated by reference in its entirety, including any appendices or attachments thereof, for all purposes.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. Field of the Invention

The present invention relates generally to data processing environments and, more particularly, to system and methods for eager and opportunistic property enforcement in a database system.

2. Description of the Background Art

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee where each record contains fields designating specifics about the employee, such as name, home address, salary, and the like.

Between the actual physical database itself (i.e., the data actually stored on a storage device) and the users of the system, a database management system or DBMS is typically provided as a software cushion or layer. In essence, the DBMS shields the database user from knowing or even caring about underlying hardware-level details. Typically, all requests from users for access to the data are processed by the DBMS. For example, information may be added or removed from data files, information retrieved from or updated in such files, and so forth, all without user knowledge of underlying system implementation. In this manner, the DBMS provides users with a conceptual view of the database that is removed from the hardware level.

DBMS systems have long since moved from a centralized mainframe environment to a de-centralized or distributed environment. Today, one generally finds database systems implemented as one or more PC "client" systems, for instance, connected via a network to one or more server-based database systems (SQL database server). Commercial examples of these "client/server" systems include Powersoft® clients connected to one or more Sybase® Adaptive Server® Enterprise database servers. Both Powersoft® and Sybase® Adaptive Server® Enterprise (formerly Sybase® SQL Server®) are available from Sybase, Inc. of Dublin, Calif. The general construction and operation of database management systems, including "client/server" relational database systems, is well known in the art. See e.g., Date, C., "An Introduction to Database Systems, Volume I and II," Addison Wesley, 1990; the disclosure of which is hereby incorporated by reference.

One purpose of a database system is to answer decision support queries. A query may be defined as a logical expression over the data and the data relationships set forth in the database, and results in identification of a subset of the database. Consider, for instance, the execution of a request for information from a relational DBMS. In operation, this request is typically issued by a client system as one or more Structured Query Language or "SQL" queries for retrieving particular data (e.g., a list of all employees earning $10,000) from database tables on a server. In response to this request, the database system typically returns the names of those employees earning $10,000, where "employees" is a table defined to include information about employees of a particular organization. The syntax of SQL is well documented, see e.g., "Information Technology—Database languages—SQL," published by the American National Standards Institute as American National Standard ANSI/ISO/IEC 9075: 1992, the disclosure of which is hereby incorporated by reference.

SQL queries express what results are requested but do not state how the results should be obtained. In other words, the query itself does not tell how the query should be evaluated by the database management system. Rather, a component called the optimizer determines the "plan" or the best method of accessing the data to implement the SQL query. The query optimizer is responsible for transforming an SQL request into an access plan composed of specific implementations of the algebraic operator selection, projection, join, and so forth. Typically, this is done by generating many different access strategies, evaluating the cost of each, and selecting the access plan with the lowest overall cost, where "cost" is a metric that measures a combination of factors, including, but not limited to, the estimated amount of computational overhead, the number of physical Input/Output ("I/O") operations, and the response time. However, producing an optimal access plan for any given SQL query is a complex problem.

In a modern optimizer, efficient handling of orderings is of great importance to query optimization. Indeed, ordering-based techniques remain unavoidable in modern query processing, despite the effectiveness of hash-based techniques, see e.g., G. Graefe, "The Value of Merge-Join and Hash-Join in SQL Server," VLDB, 1999 and G. Graefe, R. Bunker, S. Cooper, "Hash Joins and Hash Teams in Microsoft SQL Server," VLDB, 1998. Ordering is intimately related to two fundamental components of relational database management systems: B-tree indices, at the implementation level, and the ORDER BY clause, at the language level. A B-tree index, besides providing direct access to database records or tuples, also provides an ordering. An ORDER BY clause explicitly requires an ordering. The naive solution, lazy sorting, is in many cases sub-optimal.

Given that ordering is important, there are many relational implementation techniques that rely on ordering and would benefit from its advanced handling. One example of a relational technique that would benefit from improved handling of orderings is merge join, the join algorithm that relies on its arguments being ordered on the equi-join clause columns. Several other relational database algorithms rely on ordered input including: merge union distinct, group sorted, distinct ordered and the min/max scalar aggregates.

An ordering is usually either provided by an index or enforced using a sorting operation or "sort node." An index being an alternative to the sort, the term "ordered input" is used instead of "sorted input" in this document. As the cost of a sorting operation is related to the amount of data to sort and as many relational algorithms preserve in their result some of the orderings provided by their arguments, sorting should be performed in the most efficient place that makes the ordering available up to the point where it is actually needed. In other words, a solution is required which provides for optimal placement of the sort node in an access plan. Because sorting is an expensive operation, optimizers typically preserve sub-plans that provide an "interesting ordering" even if there are other cheaper (in terms of query execution cost) sub-plans that do not provide an interesting ordering. "Interesting ordering" involves consideration of the ordering of intermediate results from operator to operator. In particular, retaining a sub-plan that has an interesting ordering may enable a sort operation to be avoided, thereby reducing overall query execution cost compared to another sub-plan that does not have an interesting ordering. However, preserving these sub-plans reduces pruning and results in more sub-plans staying in the competition to create the best total plan. This results in an increase in the search space.

Among the ordering-based algorithms, distinct and group ordered are very inexpensive (in terms of query execution cost) implementations (non-blocking, on-the-fly, relying on their input having an ordering on the grouping columns) of an otherwise expensive operator. The distinct logical relational operator, also called delta-project, removes the duplicate tuples from its input; it groups on all of its columns. Its distinct ordered implementation relies on an ordered input to output a single tuple for each contiguous group of duplicates. The physical operator is "non-blocking" or "on-the fly", as it does not need to read (and keep in some temporary storage) its whole input before output of its first tuple. This physical operator does not need to go back and visit an input tuple more than once. Instead, it keeps the current tuple and if the next tuple is equal (column wise), then it is discarded. All duplicates are contiguous in ordered input. Likewise, group ordered is a non-blocking vector aggregation physical operator that relies on its input to be ordered on the grouping columns. As all tuples in a group are thus guaranteed to be contiguous, the aggregate functions of each group can be computed on-the-fly, while traversing the input. Conversely sort is a "blocking" physical operator in that it may not produce its first result tuple before having seen the last tuple in its input, as the last tuple could be the first one in the requested sort order.

The sorting-based algorithms which are "ordering related" (rather than "ordering-based") are also relevant. As illustrated above, ordering-based algorithms take advantage of the ordering available in their inputs, but do not contain a sort. The sorting-based algorithms use in their implementation a sorting process. Within the sorting algorithm, it is inexpensive to eliminate duplicates, both while building the sorted runs and while merging them. Likewise, while sorting and eliminating duplicates on some columns, it is feasible and inexpensive (in terms of query execution cost) to incrementally compute aggregation functions on other columns (for a class of aggregation functions). This is the group sorting algorithm. These algorithms are less expensive than the sort, due to the beneficial outcome of the early reduction of the size of the sort runs, see e.g., D. Bitton, D. J. DeWitt, "Duplicate Record Elimination in Large Data Files," TODS 8(2), 1983 and W. P. Yan, P. Larson, "Data reduction through early grouping," Proceedings of the 1994 IBM CAS Conference, Toronto, November, 1994. They provide an ordering on the grouping columns, in the same manner as a basic sort.

There are known eager/lazy grouping transformations, that allow the placement of one or several group nodes (i.e., grouping operations) in various legal places in the plan of a GROUP BY query. Likewise, when distinctness needs to be enforced (for instance for a SELECT DISTINCT) there are similar (and simpler) eager/lazy transformations. These are important optimizations, as grouping (and its simplified form, distinctiveness enforcement) both influences the plan and is influenced by the plan. It is influenced by the plan, as an ordered input allows use of a more efficient algorithm. It influences the plan by its execution cost (which can, for some of the grouping algorithms, be quite high) and also by the cardinality reduction in the grouped result (which decreases the cost of the parent nodes).

However, the tentative enforcement of grouping in all places where it is algebraically correct (see e.g., C. A. Galindo-Legaria, M. Joshi, "Orthogonal Optimization of Subqueries and Aggregation," SIGMOD Conference, 2001) will increase the search space with various degrees of partially grouped sub-plans. In addition, as optimizers can be incorrect, one needs to constrain their choices with abstract plans (APs), see e.g., M. Andrei, P. Valduriez, "User-Optimizer Communication using Abstract Plans in Sybase ASE," VLDB, 2001. An abstract plan is a physical relational algebra expression that fully or partially describes the plan of a given query. The AP is given to the optimizer, which in turn generates a complying plan. Unfortunately, it is a known hard problem to build the validity proof of an abstract plan that is more complex than just giving the join order and the access methods such as an AP that implies order based algorithms and eager/lazy aggregation. However, building the validity proof of an abstract plan is not only useful but is also typically required in commercial implementations. It is useful as the sort, distinct, and group placement in a plan heavily affects performance. It may also be considered as mandatory as a commercial relational database management system (RDBMS) may not rely on the validity (with respect to the associated query) of an arbitrary abstract plan supplied by the user. Reliance on a given abstract plan supplied by the user can produce incorrect results, so the optimizer must be able to prove the correctness of an abstract plan in order to accept it.

What is required is a solution that will provide for improved handling of orderings enforcement by a query optimizer. The solution should provide for improved handling of orderings while avoiding an increase in the optimization search space or the execution cost of the query execution plan. Ideally, the solution should also implement the validity proofs needed for abstract plans that cover sorting, aggregation, and other more complex expressions. The present invention fulfills these and other needs.

GLOSSARY

The following definitions are offered for purposes of illustration, not limitation, in order to assist with understanding the discussion that follows.

Directed acyclic graph: A directed graph is a graph whose edges are ordered pairs of vertices (nodes). Each edge of a directed graph can be followed from one node (vertex) to the next. A directed acyclic graph is a directed graph where no path starts and ends at the same node.

Eager property enforcement: Eager property enforcement is a formalization and enhancement of the known "interesting properties" enforcing technique which is applied in the system of the present invention to several physical properties, including ordering. More particularly, the eager property enforcement method of the present invention involves placing an enforcer in advance (a priori) when a new cheapest plan is added to an equivalence class. With this eager property enforcement approach, no enforcer needs to be added when a parent looks for a child node, as the enforcer is already present. Eager property enforcement relies upon knowing in advance the needs of all possible parents of any plans in an equivalence class. The method of the present invention for eager property enforcement is described in detail below in this document.

Enforceable properties: Enforceable properties are an extension of the enforcement of physical properties to also cover logical properties. Their application to ordering and aggregation is described below in this document.

Equivalence class or Eqc: An equivalence class or Eqc is a grouping of plans or sub-plans covering the same tables of a database. The characteristics of an equivalence class are that an equivalence class is identified by its set of underlying tables and that its candidate plans (or sub-plans) compete with each other to be part of the best total plan. For example, a sub-plan joining tables A and B is in a different equivalence class than a sub-plan joining tables B and C. The plan cache contains the set of created equivalence classes (Eqcs).

Logical property: A property that depends only on a logical expression is referred to as a logical property. A logical property can have the same value for a group of plans. For instance, the set of underlying tables is a logical property shared by all plans in an equivalence class. For queries that have no aggregation, the set of available attributes (columns) is an equivalence class level logical property and so is the set of projected columns (i.e., the ones needed by any parent equivalence class).

Maximal useful property: The eager property enforcement approach of the present invention is to model a set of corresponding interesting physical properties with a logical property which is referred to as the maximal useful property. The maximal useful property is used to represent the physical property of an enforcer and shares the same representation as the underlying physical property. The maximal useful property is used to represent an available property and can be compared, propagated, and so forth. The difference between the underlying (physical) property that is needed and its corresponding (logical) maximal useful property lies in their semantics. The maximal useful property is known in advance (a priori) for an equivalence class. The needed/useful property is known after the fact (a posteriori), for a given plan of that equivalence class.

Normalization: In the context of database design, normalization is the process of organizing data to minimize redundancy. In this document, normalization refers to the process of converting a database query into a simpler form that can be more efficiently analyzed by the query optimizer to deduce better data access strategies.

Opportunistic property enforcement: Opportunistic property enforcement is an aggregation optimization methodology of the present invention which takes advantage of both existing orderings and order enforcing within the eager ordering enforcement framework. The opportunistic property enforcement method of the present invention optimizes aggregation by taking advantage of the eager enforcement of ordering. This approach effectively applies the known aggregation transforms while avoiding an increase in the search space. Opportunistic property enforcement is described in detail below in this document.

Physical property: Properties that are known only for a given physical implementation of a logical relational expression are called physical properties. Not all properties of a plan depend only on the logical level relational expression describing it. The ordering of the data stream produced by the plan depends on the actual algorithms implementing the physical nodes. Some orderings are produced (e.g., by an index scan or a sort), some are preserved (e.g., the outer ordering of a join) and some are destroyed (e.g., the inner ordering of a join, with some exceptions). With respect to the optimization process, the physical properties are a posteriori in nature.

Plan cache: As an optimizer gradually builds alternative total plans (i.e., plans that have the same semantics as the original SQL query and that constitute candidates to become the final query execution plan); the optimizer keeps partial plans that are candidates to become part of the final query execution plan in a plan cache. In the currently preferred embodiment, the plan cache is implemented as a directed acyclic graph.

Predicate: In the context of relational databases a predicate is a truth-valued function, possibly negated, whose domain is a set of attributes and/or scalar values and whose range is {true, false, unknown}.

Property: The term property refers to a quantifiable characteristic or attribute of an object. In the context of relational databases, the term property refers to a quantifiable characteristic of a relational expression, sub-expression, or operator.

Query execution plan or QEP: A query execution plan or QEP is a demand-driven tuple stream "iterator" tree, which is a data structure that is interpreted by the relational database management system's execution module or engine. This procedural construct is richer than a pure relational algebra expression. A QEP is a tree of relational algorithms applied to input tuple streams. A (logical level) relational expression is composed of (logical level) relational operators; it is a tree of logical nodes. A QEP or plan is composed of physical level relational operators (or algorithms); it is a tree of physical nodes. These physical operators are nodes in a tree that have children. A tree of physical operators is a sub-plan or the full (final) plan. A plan is the full plan if it covers the total semantics of the query (i.e., if the result set of the root node of the plan tree delivers the result set of the query). In this document, references to a QEP or plan refer to a query execution plan (or a portion thereof) unless otherwise indicated by the context.

Sub-plan or plan fragment: A sub-plan or plan fragment is a tree of physical operators that is a portion of a (full) query execution plan (as defined above) or a candidate to become a portion of a (full) query execution plan.

SQL: SQL stands for Structured Query Language, which has become the standard for relational database access, see e.g., "Information Technology—Database languages—SQL," published by the American National Standards Institute as American National Standard ANSI/ISO/IEC 9075: 1992, the disclosure of which is hereby incorporated by reference. For additional information regarding SQL in database systems, see e.g., Date, C., "An Introduction to Database Systems, Volume I and II," Addison Wesley, 1990, the disclosure of which is hereby incorporated by reference.

SUMMARY OF THE INVENTION

A database system providing methods for eager and opportunistic property enforcement is described. A method for eager ordering enforcement enabling improved query optimization commences with receipt of a query that requests data from a database and requests the data to be ordered. Plan fragments are generated for obtaining the data requested by the query. Plan fragments covering the same tables of the database are grouped together in classes. For each class, the particular plan fragment having the lowest execution costs for obtaining the requested data is determined. Any required ordering enforcement operator is added to this particular plan fragment to provide the needed ordering of data.

A method for eager and opportunistic enforcement enabling improved query optimization, commences with the receipt of a query for data from a database which requests ordering and grouping of the data. Sub-plans are generated for obtaining data requested by the query. Each of these sub-plans comprises a portion of an overall query execution plan. The sub-plans that are generated are organized into classes based upon tables covered by each sub-plan. For each class, a particular sub-plan having the lowest execution costs is determined. If grouping is not required at a given class, an operator enforcing ordering is added to this particular sub-plan. However, if grouping is required at the given class, an operator enforcing both grouping and ordering is added to this sub-plan.

BRIEF DESCRIPTION OF THE DRAWINGS

FIG. 5 illustrates exemplary equivalence class level logical properties computed by the optimizer of the present invention for the plan cache shown at FIG. 4.

FIG. 6 illustrates the operational differences in different classes of optimizer search engines.

FIG. 11 is an illustration of a sample abstract plan which describes the query execution plan shown in FIG. 10.

DETAILED DESCRIPTION OF A PREFERRED EMBODIMENT

The following description will focus on the presently preferred embodiment of the present invention, which is implemented in a desktop application operating in an Internet-connected environment running under a desktop operating system, such as the Microsoft® Windows operating system running on an IBM-compatible PC. The present invention, however, is not limited to any one particular application or any particular environment. Instead, those skilled in the art will find that the system and methods of the present invention may be advantageously embodied on a variety of different platforms, including Macintosh, Linux, BeOS, Solaris, UNIX, NextStep, FreeBSD, and the like.

Therefore, the description of the exemplary embodiments that follows is for purposes of illustration and not limitation.

I. Computer-Based Implementation

A. Basic System Hardware (e.g., for Desktop and Server Computers)

Figure 1:
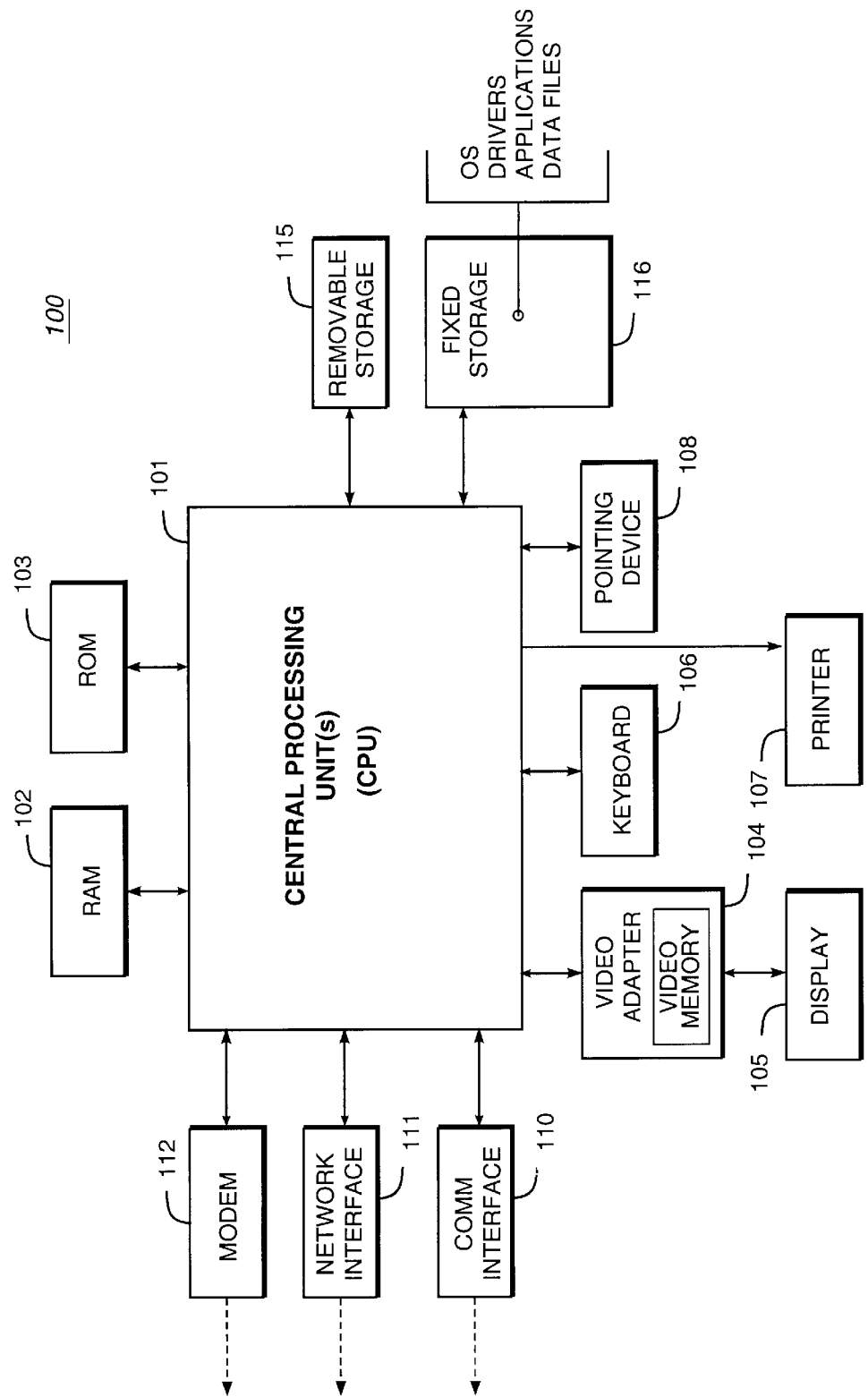
FIG. 1 is a block diagram of a computer system in which software-implemented processes of the present invention may be embodied.

The present invention may be implemented on a conventional or general-purpose computer system, such as an IBM-compatible personal computer (PC) or server computer. FIG. 1 is a very general block diagram of an IBM-compatible system 100. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real-time system clock is included with the system 100, in a conventional manner.

CPU 101 comprises a processor of the Intel Pentium® family of microprocessors. However, any other suitable processor may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP LaserJet® printer (available from Hewlett-Packard of Palo Alto, Calif.), for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Compaq Computers of Houston, Tex., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

B. Basic System Software

Figure 2:
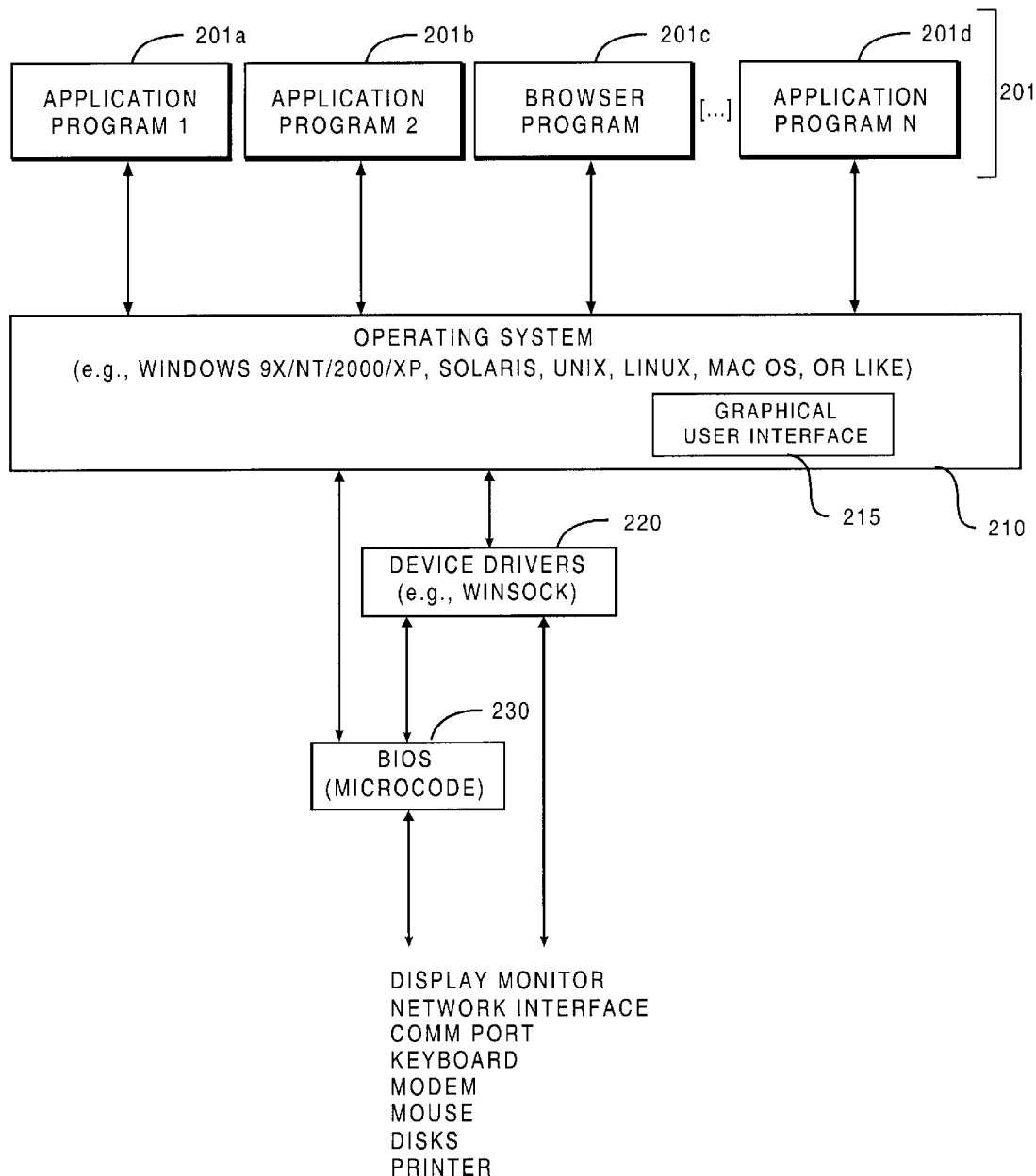
FIG. 2 is a block diagram of a software system for controlling the operation of the computer system.

Illustrated in FIG. 2, a computer software system 200 is provided for directing the operation of the computer system 100. Software system 200, which is stored in system memory (RAM) 102 and on fixed storage (e.g., hard disk) 116, includes a kernel or operating system (OS) 210. The OS 210 manages low-level aspects of computer operation, including managing execution of processes, memory allocation, file input and output (I/O), and device I/O. One or more application programs, such as client application software or "programs" 201 (e.g., 201a, 201b, 201c, 201d) may be "loaded" (i.e., transferred from fixed storage 116 into memory 102) for execution by the system 100.

System 200 includes a graphical user interface (GUI) 215, for receiving user commands and data in a graphical (e.g., "point-and-click") fashion. These inputs, in turn, may be acted upon by the system 100 in accordance with instructions from operating system 210, and/or client application module(s) 201. The GUI 215 also serves to display the results of operation from the OS 210 and application(s) 201, whereupon the user may supply additional inputs or terminate the session. Typically, the OS 210 operates in conjunction with device drivers 220 (e.g., "Winsock" driver—Windows' implementation of a TCP/IP stack) and the system BIOS microcode 230 (i.e., ROM-based microcode), particularly when interfacing with peripheral devices. OS 210 can be provided by a conventional operating system, such as Microsoft® Windows 9x, Microsoft® Windows NT, Microsoft® Windows 2000, or Microsoft® Windows XP, all available from Microsoft Corporation of Redmond, Wash. Alternatively, OS 210 can also be an alternative operating system, such as the previously mentioned operating systems.

C. Client/Server Database Management System

Figure 3:
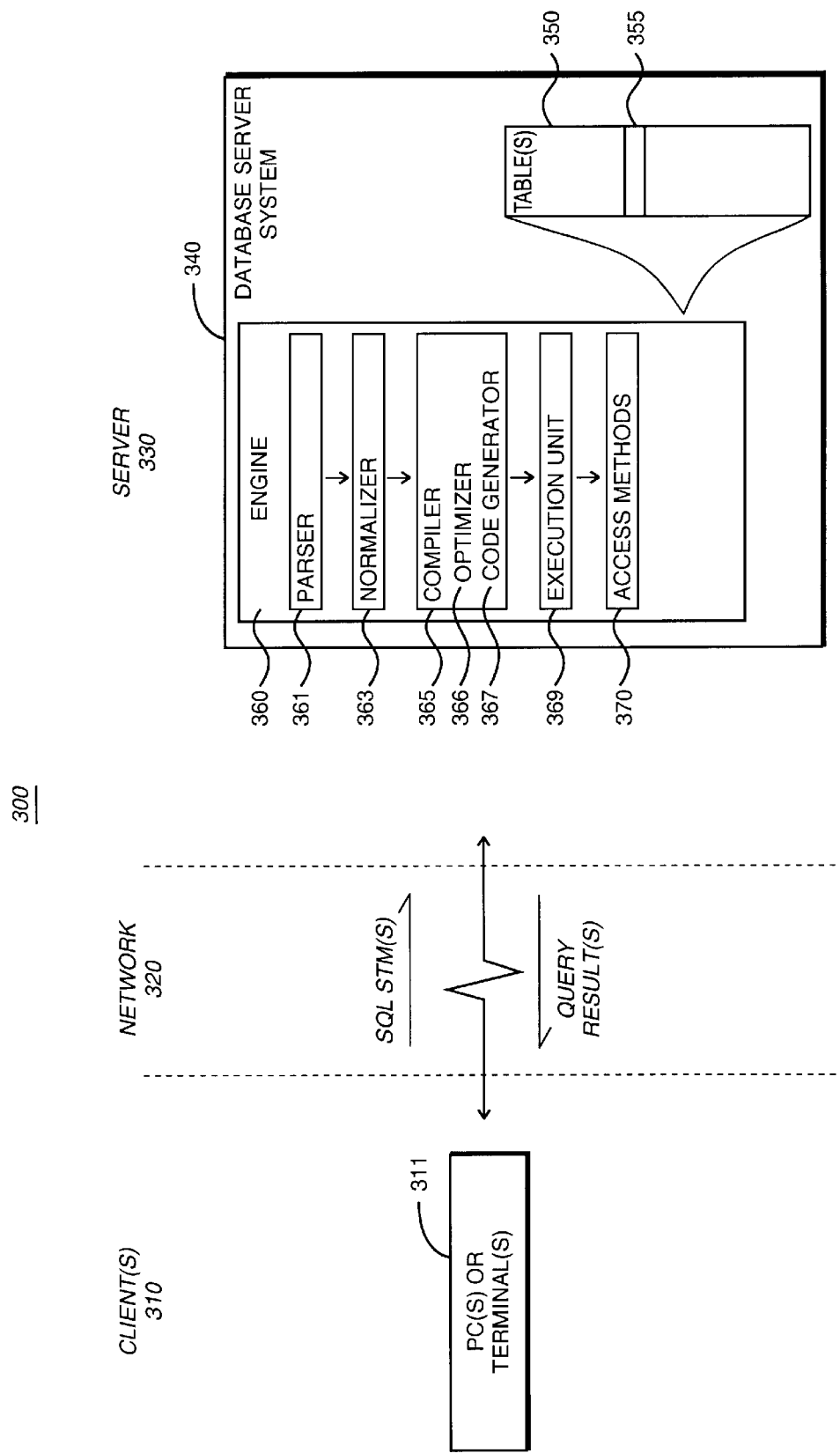
FIG. 3 illustrates the general structure of a client/server database system suitable for implementing the present invention.

While the present invention may operate within a single (standalone) computer (e.g., system 100 of FIG. 1), the present invention is preferably embodied in a multi-user computer system, such as a client/server system. FIG. 3 illustrates the general structure of a client/server database system 300 suitable for implementing the present invention. As shown, the system 300 comprises one or more client(s) 310 connected to a server 330 via a network 320. Specifically, the client(s) 310 comprise one or more standalone terminals 311 connected to a database server system 340 using a conventional network. In an exemplary embodiment, the terminals 311 may themselves comprise a plurality of standalone workstations, dumb terminals, or the like, or comprise personal computers (PCs) such as the above-described system 100. Typically, such units would operate under a client operating system, such as Microsoft® Windows client operating system (e.g., Microsoft® Windows 95/98, Windows 2000, or Windows XP).

The database server system 340, which comprises Sybase® Adaptive Server® Enterprise (available from Sybase, Inc. of Dublin, Calif.) in an exemplary embodiment, generally operates as an independent process (i.e., independently of the clients), running under a server operating system such as Microsoft® Windows NT, Windows 2000, or Windows XP (all from Microsoft Corporation of Redmond, Wash.), or UNIX (Novell). The network 320 may be any one of a number of conventional network systems, including a. Local Area Network (LAN) or Wide Area Network (WAN), as is known in the art (e.g., using Ethernet, IBM Token Ring, or the like). Network 320 includes functionality for packaging client calls in the well-known SQL (Structured Query Language) together with any parameter information into a format (of one or more packets) suitable for transmission across a cable or wire, for delivery to the database server system 340.

Client/server environments, database servers, and networks are well documented in the technical, trade, and patent literature. For a discussion of database servers and client/server environments generally, and Sybase architecture particularly, see, e.g., Nath, A., "The Guide to SQL Server," Second Edition, Addison-Wesley Publishing Company, 1995. For a description of Sybase® Adaptive Server® Enterprise, see, e.g., "Adaptive Server Enterprise 12.5 Product Documentation," available from Sybase, Inc. of Dublin, Calif. (and currently available via the Internet at http:sybooks.sybase.com/asg1250e.html). The disclosures of the foregoing are hereby incorporated by reference.

In operation, the client(s) 310 store data in, or retrieve data from, one or more database tables 350, as shown at FIG. 3. Typically resident on the server 330, each table itself comprises one or more rows or "records" (tuples) (e.g., row 355), each storing information arranged by columns or "fields." A database record includes information which is most conveniently represented as a single unit. A record for an employee, for example, may include information about the employee's ID Number, Last Name and First Initial, Position, Date Hired, Social Security Number, and Salary. Thus, a typical record includes several categories of information about an individual person, place, or thing. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed.

In operation, the clients 310 issue one or more SQL commands to the server 330. SQL commands may specify, for instance, a query for retrieving particular data (i.e., data records meeting the query condition) from the database table(s) 350. The syntax of SQL (Structured Query Language) is well documented; see, e.g., the above-mentioned "An Introduction to Database Systems." In addition to retrieving the data from Database Server tables, the Clients also include the ability to insert new rows of data records into the table; Clients can also modify and/or delete existing records in the table(s).

In operation, the SQL statements received from the client(s) 310 (via network 320) are processed by engine 360 of the database server system 340. Engine 360 itself comprises parser 361, normalizer 363, compiler 365, execution unit 369, and access methods 370. Specifically, the SQL statements are passed to the parser 361 which converts the statements into a query tree—a binary tree data structure which represents the components of the query in a format selected for the convenience of the system. In this regard, the parser 361 employs conventional parsing methodology (e.g., recursive descent parsing).

The query tree is normalized by the normalizer 363. Normalization includes, for example, the elimination of redundant data. Additionally, the normalizer 363 performs error checking, such as confirming that table names and column names which appear in the query are valid (e.g., are available and belong together). Finally, the normalizer can also look-up any referential integrity constraints which exist and add those to the query.

After normalization, the query tree is passed to the compiler 365, which includes an optimizer 366 and a code generator 367. The optimizer is responsible for optimizing the query tree. The optimizer performs a cost-based analysis for formulating a query execution plan. The optimizer will, for instance, select the join order of tables (e.g., when working with more than one table); it will select relevant indexes (e.g., when indexes are available). The optimizer, therefore, performs an analysis of the query and picks the best execution plan, which in turn results in particular ones of the access methods being invoked during query execution.

The code generator, on the other hand, converts the query tree into a set of instructions suitable for satisfying the query. These instructions are passed to the execution unit 369. Operating under the control of these instructions, the execution unit 369 generates calls into lower-level routines, such as the access methods 370, for retrieving relevant information (e.g., row 355) from the database table 350. After the plan has been executed by the execution unit, the server returns a query result or answer table back to the client(s).

The above-described computer hardware and software are presented for purposes of illustrating the basic underlying desktop and server computer components that may be employed for implementing the present invention. For purposes of discussion, the following description will present examples in which it will be assumed that there exists a "server" (e.g., database server) that communicates with one or more "clients" (e.g., personal computers). The present invention, however, is not limited to any particular environment or device configuration. In particular, a client/server distinction is not necessary to the invention, but is used to provide a framework for discussion. Instead, the present invention may be implemented in any type of system architecture or processing environment capable of supporting the methodologies of the present invention presented in detail below.

II. Eager and Opportunistic Property Enforcement
A. Overview

In a database management system (DBMS), clients (i.e., users) issue queries (e.g., SQL commands) for retrieving particular data from database tables. Before an SQL query can be executed by the DBMS, it must be translated into a format appropriate for execution by the DBMS. As previously described, an SQL query received from a client is typically parsed into a query tree which represents the logical relational expression of the query. The role of an optimizer is to determine the most efficient physical level relational expression (i.e., a query execution plan) for execution of this query against the database. This can be formalized as the search for the best physical level relational expression that has the same semantics (i.e., is equivalent to) the SQL query. For instance, if the query includes a GROUP BY, the query execution plan must include an appropriate physical relational operator that implements the required ordering.

The present invention comprises a system providing for improved query optimization by providing for optimal placement of certain physical operators in the final query execution plan. Methodology of the present invention provides for optimal placement in the query execution plan of nodes (i.e., physical operators) that implement the ordering and aggregation semantics of the query (e.g., group nodes, distinct nodes, sort nodes, and Xchg nodes). The system and method of the present invention provides an optimal ordering handling technique called "eager property enforcement." This technique may be applied not only for ordering, but also may be used to model both SMP (symmetric multiprocessing) and cluster partitioning. The system of the present invention also provides an aggregation optimization methodology called "opportunistic property enforcement," which takes advantage of both existing orderings and order enforcing within the eager ordering enforcement framework. Opportunistic property enforcement may be applied to aggregation. This methodology may also be used in a database optimizer to implement a simplified flavor of aggregation; namely elimination of duplicates. In addition, the present invention provides a method for providing validity proof of abstract plans (APs) that enforce properties such as ordering and partitioning.

Eager and opportunistic property enforcement and abstract plans are general techniques that work for various types of optimizers, including "top-down" and "bottom-up" optimizers (as hereinafter described) as well as "breadth-first" and "depth-first" optimizers (as hereinafter described), whether rule-based or not. The system and method of the present invention provides an integrated solution for problems that are usually solved separately. The approach of the present invention solves these problems in a manner that minimizes the search space traversal by a database optimizer. The present invention also addresses the problems of ordering and aggregation optimization and abstract plans support. To solve these problems, the method of the present invention relies on logical properties and introduces several concepts: "enforceable properties," "eager property enforcement," and "opportunistic property enforcement."

"Enforceable properties" are an extension of the enforcement of physical properties to also cover logical properties. Their application to ordering and aggregation is described below. "Eager property enforcement" is a formalization and improvement of the known property enforcing technique. It is applied in the system of the present invention to several physical properties, including ordering. This technique of the present invention enables optimal search space traversal. "Opportunistic property enforcement" is a novel approach to optimize aggregation by taking advantage of the eager enforcement of ordering. This approach effectively applies the known aggregation transforms while avoiding an increase in the search space. Further, the logical property-based framework of the present invention addresses the abstract plan (AP) validity proof problem. This provides a solution for abstract plans that also enforce sorting, aggregation, and other such complexities.

B. Introduction to Database Optimization Concepts
1. Queries and Plans, Logical and Physical Algebras The following discussion introduces certain underlying database query optimization concepts enabling better understanding of the present invention. In the currently preferred embodiment, the engine of the database system employs a Volcano style query execution engine. For further information on the Volcano model of plan execution, see e.g., Graefe, G. "Volcano—an Extensible and Parallel Query Evaluation System," IEEE Transactions on Knowledge and Data Engineering (TKDE), volume 6(1), February 1994, the disclosure of which is hereby incorporated by reference. As described below, a query execution plan (QEP) is a demand-driven tuple stream "iterator" tree. The optimizer of the currently preferred embodiment has an adaptive, multi-search engine, infrastructure. In the currently preferred embodiment, the optimizer uses a bottom-up search engine for the reasons discussed below. The following discussion focuses on the optimizer's search engine and on the way it handles ordering and aggregation.

A query execution plan (QEP) is a data structure that is interpreted by the relational database management system's execution module or engine. This procedural construct is richer than a pure relational algebra expression. A QEP is a tree of relational algorithms applied to input tuple streams. As several algorithms implement a given relational operator, "physical level" relational algebras are introduced to describe a QEP. Indeed, it is not sufficient to give the join operator of two relations; one also needs to specify whether the join operator is a nested loops join, a merge join or a hash join algorithm. When the distinction is needed, pure relational algebras are called "logical level" algebras.

A (logical level) relational expression is thus composed of (logical level) relational operators; it is a tree of logical nodes. A QEP is composed of physical level relational operators (or algorithms); it is a tree of physical nodes. In following portions of this document, the behavior of the optimizer will be illustrated using as an example query Q3 from the Transaction Processing Performance Council TPC Benchmark H (TPC-H). A copy of the TPC-H database benchmark is available from the Transaction Processing Performance Council and is currently available via the Internet at http://www.tpc.org/tpch. TPC-H query Q3 is illustrated in Example 1 below:

EXAMPLE 1

The TPCH query Q3 select
12, sum(13) as s_13, o3, o4
from
c, o, 1 where
   c1=o2 and—p1
   o1=12 and—p2
   c2='automotive' and—p3
   o3<date 'yesterday' and—p4
   14>date 'yesterday' —p5
group by
   12, o3, o4
order by
   s_desc, o3

For brevity, customer, orders and lineitem are respectively named c, o and l. Likewise, their columns are called $c_i$, $o_j$ and $l_k$. Note that the expression below the sum( ) aggregate in the TPCH query Q3 has been simplified in the above Example 1, as its content is irrelevant to this discussion. The predicates in the Example 1 are named p1, p2, p3, p4, and p5, as shown above.

The exemplary indices that are available for purposes of this discussion are illustrated below in Example 2:

EXAMPLE 2

Available Indices

| Tab | Index | Key |
|---|---|---|
| c | ic1 | c(c1) |
|   | ic2 | c(c2) |
|   | ic12 | c(c1, c2) |
| o | io1 | o(o1) |
|   | io2134 | o(o2, o1, o3, o4) |
|   | io3 | o(o3) |
| 1 | il2 | l(l2) |
|   | il4 | l(l4) |
|   | il234 | l(l2, l3, l4) |

The availability of all useful indices increases both the optimizer's chance to find a cheap access plan (i.e., one with low execution costs) and the complexity of its search space. The exemplary indices above include "covering" indices (i.e., indices that contain all columns needed by the query) to avoid data page versus index page access considerations.

2. Basic Optimization of Query Execution

Optimization is the process of finding the best query execution plan (QEP) that has the same semantics (i.e., result) as the SQL query. This can be formalized by the search of the best physical relational expression that is equivalent to the canonical logical relational expression of the SQL query. To achieve this result, the optimizer inspects a search space by transforming the initial expression. This transformation typically includes reordering expressions using algebraic rules (associativity, commutativity, etc.), replacing the logical operators with the physical operators that implement them, and enforcing the properties needed by some algorithms.

The optimizer thus gradually builds alternative total plans (i.e., plans that have the same semantics as the original SQL query and that constitute candidates to become the final QEP) and estimates the cost of each alternative using a cost model. The optimizer keeps the partial plans (referred to as plan fragments or sub-plans) in a "plan cache." The optimizer selects the total plan that is determined to be the "cheapest" one to execute and that has the properties needed by the query. For purposes of this discussion, "cheapest" means the plan with the lowest execution cost based upon the cost model. When the optimizer generates sub-plans, only the ones that are likely to be part of the best total plan are retained and the other sub-plans are eliminated or "pruned."

There are a number of seminal papers that describe general optimization frameworks. These optimization frameworks include: System R (see e.g., P. G. Selinger et al, "Access Path Selection in a Relational Database Management System," SIGMOD Conference, 1979), Starburst (see e.g., G. M. Lohman, "Grammar-like Functional Rules for Representing Query Optimization Alternatives," SIGMOD Conference, 1988), EXODUS (see e.g., G. Graefe, D. J. DeWitt, "The EXODUS Optimizer Generator," SIGMOD Conference, 1987), Volcano (see e.g., Goetz Graefe, William J. McKenna, "The Volcano Optimizer Generator, Extensibility and Efficient Search," ICDE, 1993), Cascades (see e.g., G. Graefe, "The Cascades Framework for Query Optimization," Data Engineering Bulletin 18(3), 1995), and Columbia (see e.g., Y. Xu, "Efficiency in the Columbia Database Query Optimizer," M. S. Thesis, Portland State University, 1998).

Ordering handling is a central topic of a few prior papers, see e.g., J. Claussen et al, "Exploiting early sorting and early partitioning for decision support query processing," VLDB Journal 9(3), 2000 and D. E. Simmen, E. J. Shekita, T. Malkemus, "Fundamental Techniques for Order Optimization," SIGMOD Conference, 1996. Ordering handling is, however, mentioned in other papers that describe general optimizer frameworks given below. For example, papers regarding the "Cascades" and "Columbia" optimizers have some relevant sections on property enforcement, see e.g., K. Billings, "A TPC-D Model for Database Query Optimization in Cascades," M. S. Thesis, Portland State University, 1997; L. D. Shapiro et al, "Exploiting Upper and Lower Bounds In Top-Down Query Optimization," IDEAS, 2001; and the above-mentioned "Efficiency in the Columbia Database Query Optimizer").

Both the "System R" and the "Starburst" bottom-up optimizers handle available orderings. The plans having "interesting orderings" are preserved. Papers regarding the System R optimizer introduce the "interesting orderings" term, and discuss handling a set of interesting orders for equi-joins and for GROUP BY and ORDER BY clauses. See e.g., the abovementioned "Fundamental Techniques for Order Optimization." However, from these papers it appears that both the System R and Starburst systems utilize "lazy, on-demand sorting." This lazy sorting method involves introducing a sorting operator for each operator that has an ordering requirement on a child. This sorting operator is introduced over the cheapest access plan implementing that child. The cost of this construct is compared with the cost of the best existing plan for the child having the required ordering available and the cheaper of the two is selected. However, when several joins are attempted over the same child, a number of sort operators may be generated.

In the rule-based top-down Cascades and Columbia optimizers, ordering is handled by requesting a sub-plan with the needed property. The invocation of an "enforcer rule" produces, as an alternative, a sorting operation over the cheapest unordered sub-plan. In the Cascades optimizer, the enforcer rule is explicitly called when an ordering property is needed. As this enforcer rule is invoked several times for a group, it typically generates duplicates. See e.g., the abovementioned "Efficiency in the Columbia Database Query Optimizer."

The Columbia optimizer includes an enhancement (compared to Cascades) in the handling of the enforcer rule. See e.g., the abovementioned "Efficiency in the Columbia Database Query Optimizer." In the Columbia optimizer, the enforcer is generated on demand, only once. It is considered to have the same cost for any key, and is left without a sort key definition. Its parents (i.e., its parent nodes in the access plan) will decide what it sorts on.

Several other papers have covered the optimization of aggregation, under different names: early grouping (see the abovementioned "Data reduction through early grouping"), generalized projection (see e.g., A. Gupta, V. Harinarayan, D. Quass, "Aggregate-Query Processing in Data Warehousing Environments," VLDB, 1995), eager and lazy aggregation (see e.g., W. P. Yan, P. Larson, "Eager Aggregation and Lazy Aggregation," VLDB, 1995), generalized selection (see e.g., P. Goel, B. R. Iyer, "SQL Query Optimization: Reordering for a General Class of Queries," SIGMOD Conference, 1996) and aggregation moving or reordering (see e.g., S. Chaudhuri, K. Shim, "Optimizing Queries with Aggregate Views," EDBT, 1996 and the abovementioned "Orthogonal Optimization of Subqueries and Aggregation").

The search space traversal complexity is one of the main measurable quality criteria of an optimizer, relevant both to the handling of ordering and of aggregation. See e.g., K. Ono, G. M. Lohman, "Measuring the Complexity of Join Enumeration in Query Optimization," VLDB, 1990; Y. E. Ioannidis, Y. Cha Kang, "Left-Deep vs. Bushy Trees: An Analysis of Strategy Spaces and its Implications for Query Optimization," SIGMOD Conference, 1991; R. S. G. Lanzelotte, P. Valduriez, M. Zaït, "On the Effectiveness of Optimization Search Strategies for Parallel Execution Spaces," VLDB, 1993; B. Vance, D. Maier, "Rapid Bushy Join-order Optimization with Cartesian Products," SIGMOD Conference, 1996; and A. Pellenkoft, C. A. Galindo-Legaria, M. L. Kersten, "The Complexity of Transformation-Based Join Enumeration," VLDB, 1997, 306-31.

3. The Plan Cache

One of several published plan cache implementations may be used for implementation of the present invention. Available plan cache implementations include the System R dynamic programming "search tree" (see e.g., the abovementioned "Access Path Selection in a Relational Database Management System") and the Cascades "MEMO" structure (see e.g., the abovementioned "The Cascades Framework for Query Optimization").

Figure 4:
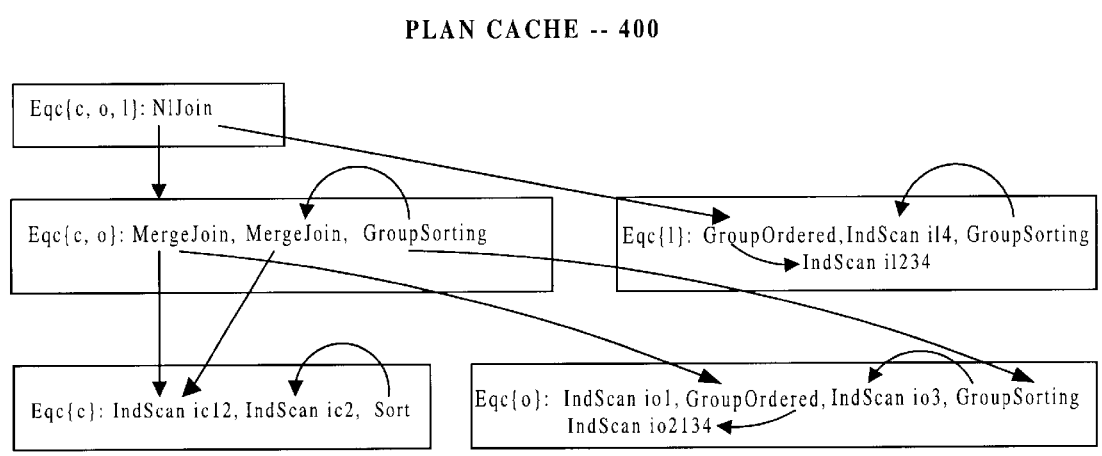
FIG. 4 is an illustration of an exemplary plan cache state at an intermediate point during the optimization of a sample query.

The optimizer of the currently preferred embodiment, which is implemented in a Sybase® Adaptive Server® Enterprise (ASE) database system, uses a structure similar to the Cascades MEMO optimizer by grouping together sub-plans (or plan fragments) covering the same base tables in plan "equivalence classes." The main characteristics of an equivalence class ("Eqc") are that an equivalence class is identified by its set of underlying tables and that its sub-plans compete with each other to be part of the best total plan. The plan cache contains the set of created equivalence classes (Eqcs). FIG. 4 is an illustration of an exemplary plan cache state at an intermediate point during the optimization of a sample query. As shown, FIG. 4 illustrates the plan cache state during the optimization of the query described above in Example 1. This Example 1 query illustrated at FIG. 4 does not contain any sum ( ), GROUP BY, or ORDER BY clauses.

The equivalence class (Eqc) of the currently preferred embodiment is similar to a MEMO equivalence class or group. Among the differences are that plans in the same equivalence class (Eqc) do not always return the same relational result; some can have grouping enforced, whereas others do not have grouping enforced. Also, the members of an Eqc are not multi-expressions but rather are the root physical node of the Eqc's sub-plans. As described later in this document, logical operators and multi-expression formalism are not needed in a bottom-up search engine. However, the present invention can also be implemented using a classical MEMO structure, provided that the properties are organized accordingly.

The plan cache of the currently preferred embodiment does not have a tree structure. Rather, the plan cache of the currently preferred embodiment utilizes a directed acyclic graph (DAG). The final query execution plan built by the optimizer of the currently preferred embodiment, conversely, is a tree. Nodes are tuple stream operators that implement the open/next/close protocol. Each node has a current status with respect to the input already consumed from its children and the output already returned to its parent. The leaf nodes (i.e., the scans) have a current position on the underlying stored table. Two parents nodes cannot share a child. As the parents advance at a different pace, each node of the shared sub-tree holds two status descriptions, one per parent. This is basically equivalent to having two copies of the shared sub-tree. Likewise, each sub-plan in the plan cache is a tree rooted at some equivalence class (Eqc). However, the entire plan cache is a directed acyclic graph (DAG). Several parents can, however, share a sub-plan, provided they do not have a common ancestor. As shown at FIG. 4, the sub-plans that scan tables c and o are shared by the joins of those tables. But a total plan will usually never contain more than a join operator for c and o.

4. Logical and Physical Properties

The term "property" is used in the literature to describe a quantifiable characteristic of a relational expression, sub-expression, or operator (i.e., a tree, sub-tree, or node of a query execution plan). When the property depends only on the logical expression, it is a "logical property." A logical property can have the same value for a group of plans. For instance, the set of underlying tables is a logical property shared by all plans in an equivalence class (Eqc). For queries that have no aggregation, the set of available columns is an Eqc level logical property and so is the set of projected columns, the ones needed by any parent. Indeed, all underlying table columns are available as well as all derived columns that transitively depend only on the underlying tables and can be thus computed. As for the projected columns, they are the columns needed by the SELECT list and by the set of predicates still to be applied.

Likewise, other equivalence class level logical properties are the set of all non-expensive predicates applied somewhere within the plan and the set of non-expensive predicates still to be applied by any parent. Indeed, non-expensive predicates are always pushed down to the deepest possible location; if all columns involved in a given predicate are available, the predicate is applied somewhere in each sub-plan; otherwise, the closest parent that has all columns available will apply the predicate. The set of all equi-joins yet to be applied by any parent is an important logical property that is used to compute the "interesting orderings." The same holds for the result of an operator and for the statistics that describe it: the cardinality of the result, the duplicates density and histogram of each column. Indeed, the result is fully determined by the underlying tables and the applied predicates, themselves determined by the underlying tables.

This layout changes when nested subqueries and the inner child of nested loop joins are also considered. The outer attribute values are stable for the whole open/next/close inner side cycle. These outer attribute values are "pushed down" and made available within the whole inner child. Likewise, predicates depending only on the outer attribute values and on attributes of the inner child are pushed down. Hence the logical properties of plans in an equivalence class (Eqc) would depend on whether a given plan is inner to a nested algorithm or not, and this is given by the set of available columns.

For queries involving aggregation, the available columns are not an equivalence class level logical property. Plans that have enforced the grouping will make available the aggregation results whereas other plans will not make aggregation results available. The logical property will be shared by the subset of plans of the Eqc with the same level of grouping enforcement. Likewise, the different classes of predicates described above will still be logical properties, but will be shared by fewer plans if they rely on aggregation results.

FIG. 5 is a table illustrating exemplary equivalence class (Eqc) level logical properties computed by the optimizer of the present invention for the sample plan cache shown at FIG. 4. These equivalence class level logical properties are properties without attribute pushdown or aggregation derived attributes. The properties describing ordering and aggregation are discussed below.

Not all properties of a plan depend only on the logical level relational expression describing it. The ordering of the data stream produced by the plan depends on the actual algorithms implementing the physical nodes. Some orderings are produced (e.g., by an index scan or a sort), some are preserved (e.g., the outer ordering of a join) and some are destroyed (e.g., the inner ordering of a join, with some exceptions). Such properties that are known only for a given physical implementation of a logical relational expression are called "physical properties." Physical properties belong to a given plan, whereas the logical properties belong to an equivalence class (Eqc).

It should be noted that, with respect to the optimization process, the logical properties have an a priori nature and the physical properties an a posteriori nature. Indeed, given a query and a logical relational expression describing a fragment of the query, one can compute the logical properties upfront, before having inspected any possible physical implementation of the expression. However the physical properties can be computed only for a given sub-plan once the sub-plan has been built.

5. Required and Available Properties

Properties are also used to express the precondition of an operator. Some operators need a property to hold onto their inputs. In this event only arguments that have the required property are legal. For instance, some relational operators, such as the merge join, need their inputs to be ordered. Others operators make an ordering available, either by creating it or by propagating the ordering of its children. The index scan and the sort create an ordering. The join propagates the ordering of its outer child.

The sort node holds a special position with respect to the ordering property: its result has the same relational content as its argument (it is a pure physical operator, meaning that it does not implement a logical relational operator). The only role of a sort node is to create an ordering. This is also called "enforcing" an ordering, the sort is called an order "enforcer" and the ordering is called an "enforceable" physical property.

To handle such physical properties (as orderings), the optimizer requires representations for the properties available at a node, the properties that a node needs from its children, and the interesting properties at an equivalence class (i.e., the ones that might be used by some parent of any plan in that Eqc). The optimizer uses these representations to build only semantically correct plans. Plans are semantically correct when the children's properties always satisfy the parent's needs. The optimizer also uses these representations to compute the property creation and propagation as well as for pruning. While pruning, the representations are needed to enable the optimizer to retain the cheapest plan that makes available an interesting property (e.g., an ordering) in cases where there is a cheaper plan that does not have an interesting property.

6. Enforceable Properties

The ordering described above is an enforceable physical property. But the same model applies also to some logical properties. For instance, the vector aggregation, or grouping, can be modeled by a logical property in which the grouping algorithms are the aggregation enforcers. For any GROUP BY query there are algebraic transforms that define the grouping columns and aggregation functions at a given Eqc. A plan will have the aggregation done (i.e., the property available or satisfied), if its root is group node or if the aggregation need was satisfied in its children and propagated up to its root. The optimizer retains in an equivalence class the cheapest plan that has the aggregation need satisfied, even when a cheaper plan exists but has no aggregation. In other words, the optimizer keeps the cheapest plan that satisfies the aggregation requirement in situations when there is a cheaper plan that does not satisfy this requirement. In some cases the root of the full plan of a GROUP BY query has an aggregation need: it must have the grouping property satisfied.

As group is a logical operator, the aggregation representation does not need physical properties: it is based on logical properties, as the set of grouping columns and aggregation functions is legal at an Eqc. In this respect it is an "enforceable logical property." Thus, the concept of an "enforceable property," a physical property generalization is introduced. An enforceable property inherits some of the characteristics of a physical property. An operator or algorithm that produces an enforceable property is called an "enforcer." In addition, the approach of the present invention is to prune (i.e., discard) a plan only if it is both more expensive and weaker for each interesting enforceable property.

It should be recognized that not all logical properties are enforceable. For instance, one cannot enforce the availability of a base table attribute in an equivalence class (Eqc) that does not contain that base table. Likewise, the cost is a physical property that is not enforceable. The method of the present invention focuses on the handling of two enforceable properties. The first of these enforceable properties is the ordering physical property. The second is the grouping logical property.

7. Properties Compared to Rules

Enforceable properties are closely related to relational expression transformation rules. In a transformation-based optimizer, the physical property enforcers are generated by the transformation rules. Likewise, eager/lazy aggregation is handled by transformation rules. The application of these rules implies the matching of a rule pattern against a representation of the relational expression to transform, resulting in the construction of the transformed expression. The sorting columns, grouping columns, aggregation functions, etc. of the transformed expression are repetitively computed as a side effect of the transformation. They are known a posteriori, once the rule is applied. When the optimization uses the "enforceable property" model, all the above scalars needed to fully construct the sort and group nodes are pre-calculated once in the equivalence class (Eqc) as logical properties. As hereinafter described, the need of a property, be it physical or logical, can be expressed with a logical property that can be computed for a given Eqc, before the generation of any plan of the Eqc. These logical properties are known a priori.

This a priori nature of the enforceable properties is the cornerstone of their usage in optimization in the system of the present invention. As hereinafter described, the optimizer uses their availability before plan enumeration in guiding the search space traversal decisions as well as the construction of query execution plans and in abstract plan (AP) validation. Before discussing these enforceable properties and the methodology of the present invention in more detail, the operations of the optimizer search engine will be described.

C. Optimizer Search Engine Taxonomy

In the abovementioned "Exploiting Upper and Lower Bounds In Top-Down Query Optimization," as in other papers regarding top-down optimizers, it is claimed that an advantage of top-down optimizers over bottom-up ones (e.g., System R and Starburst) is the ability of top-down optimizers to quickly obtain a complete plan and thus prune further sub-plans against the cheapest total cost. However, it is the depth-first nature of an optimizer (e.g., Cascades) that supplies this advantage, rather than top-down vs. bottom-up distinction. Optimizers are classified in the literature from the viewpoint of the search space inspection as being top-down or bottom-up. This classification is not sufficient to understand the optimizer behavior. Instead, an optimizer must be classified as both depth-first vs. breadth-first as well as top-down vs. bottom-up in nature. These classifications will now be explained.

Top-down optimizers start by enumerating the implementation alternatives of the top, root equivalence class (Eqc). They divide the initial optimization problem into sub-problems. Then the top-down optimizer proceeds to go down and recursively solve each sub-problem. Bottom-up optimizers, on the other hand, start by enumerating the implementation alternatives of the bottom, leaf equivalence classes (Eqcs). Thus, these bottom-up optimizers build minimal solution fragments for the optimization problem. Then, they proceed up and gradually build larger solution fragments based on the available smaller solution fragments.

Breadth-first optimizers exhaustively enumerate all implementation alternatives of an Eqc before moving to the next one. Pure breadth-first optimizers move sideways, i.e., they enumerate all peer Eqcs before passing to a different level. Depth-first optimizers, in contrast, keep the current enumeration point for each active Eqc and move to another one before completing the enumeration. Pure depth-first optimizers move as soon as they have a new alternative.

FIG. 6 illustrates the operational differences in different classes of optimizer search engines. Block 610 depicts the operations of a depth-first, bottom-up search engine. Block 610 includes equivalence classes 611, 612, 613, 614, 615. Each of the circles in these equivalence classes represents a node of a query execution plan. Arrow 618 represents the main (or primary) direction in which in the search engine will move. As shown at block 610, arrow 618 indicates the primary direction of this type of optimizer is upwards from the bottom (i.e., bottom-up). Arrow 619 represents the secondary direction, which is the direction in which the search engine tries to move when it exhausts a path in the main direction. As shown, the secondary direction of this depth-first, bottom-up optimizer is sideways to enumerate all peer implementation classes.

Block 620 illustrates a breadth-first, bottom-up optimizer. As shown, block 620 includes equivalence classes 621, 622, 623, 624, 625. Arrow 628 represents the main (or primary) direction in which in the search engine will move. As shown, arrow 628 indicates the primary direction of this optimizer is sideways. Arrow 629 represents the secondary direction, which in this case is upwards from the bottom (i.e., bottom-up).

Blocks 630 and 640 illustrate top-down optimizers. Block 630 shows a depth-first, top-down optimizer with equivalence classes 631, 632, 633, 634, 635, 636, 637. Block 640 depicts a breadth-first, top-down optimizer containing equivalence classes 641, 642, 643, 644, 645, 646, 647. Arrows 638 and 648 represent the main (or primary) direction in which in each of these search engines will move. As shown, Arrow 638 indicates the primary direction of a depth-first, top-down optimizer is downwards from the top. Arrow 639 illustrates that the secondary direction of this search engine (block 630) is sideways. As shown by arrow 648 at block 640, the main direction of movement of a breadth-first, top-down search engine is sideways. The secondary direction is down from the top as shown by arrow 649. The search engine directions have the following implications on costing, property handling and pruning.

The above theoretical concepts do not have a pure application in any working optimizer implementation. For instance, there are no pure top-down optimizers because costing and property propagation are part of finding a solution. Costing and property propagation can usually be processed only bottom-up, as one cannot compute the cost or properties of a node before having computed the cost or properties for its children (assuming a real life cost model which also estimates the input and output (I/O) costs). For example, Volcano is neither a pure depth-first nor a pure breadth-first optimizer. It fully enumerates an Eqc before moving, but it does not move sideways. Both the base Volcano and Cascades are largely top-down optimizers. An important difference consists in the depth-first nature of Cascades that avoids enumerating all logical expressions before moving to the physical ones. The System R optimizer is a dynamic programming-based pure breadth-first, bottom-up optimizer.

The optimizer of the currently preferred embodiment has a (non-pure) depth-first, bottom-up search engine. It fully enumerates the sub-plans in single table equivalence classes (Eqcs). Then, at each higher-level Eqc, it adds increments by enumerating all plans based on the newly added increments of the current children Eqc. As soon as a child configuration is thus consumed, the search engine moves up to the next level. Actually, before having obtained a first full plan, the optimizer of the currently preferred embodiment adopts a pure depth-first strategy, trying to reach a reasonably cheap plan as soon as possible. With this pruning high water mark established, it switches back to the relaxed depth-first strategy. However, the plan cache of the currently preferred embodiment is designed to accommodate, when needed, any kind of search engine.

As previously mentioned, both costing and available property handling are generally performed in a bottom-up direction. Costing is usually performed bottom-up because the cost of children nodes is generally needed to compute the cost of the parent. Logical cost models are an exception to this general rule in that logical costs (i.e., derived relation cardinality) can be computed in advance. However, these logical cost models have little expressive power. The costliest operations in a real life environment are typically the disk input and output (I/O) and, for clusters, the network transfer of data. Neither of these operations can be assumed proportional to the derived relation cardinality if the actual plan is not known. Available property computing (or handling) is also usually performed bottom-up. Most nodes (except, for instance, enforcer nodes) need their children's properties to compute what they should propagate up to their parent node.

Breadth-first and depth-first search engines have very different approaches for pruning. Breadth-first search engines generally cannot prune sub-plans against the cheapest current full plan. For this reason they reach their first full plan relatively late in the optimization process. In contrast, depth-first, search engines do some amount of pruning of sub-plans as they proceed. Depth-first, top-down search engines reach a full plan relatively quickly. However, they cannot accurately cost their sub-plans because their children's plans are not yet known. Their pruning method is based on logical costing which is less accurate and less effective in pruning sub-plans.

Depth-first bottom-up search engines are more effective in pruning sub-plans. These depth-first, bottom-up search engines typically reach a full plan relatively quickly. Moreover, each time they add a new sub-plan they essentially add a new parent node over fully costed children and the new sub-plan's cost is immediately known. If the new sub-plan's cost is too expensive, the whole search space region of its parents is pruned. For these reasons, the optimizer of the currently preferred embodiment uses a depth-first, bottom-up search engine.

D. Eager Property Enforcement

1. Eager Enforcement Using Maximal Useful Property

For an enforceable property, a key issue is how the optimizer should handle placing the enforcers (i.e., operators that produce enforceable properties). An optimizer may place the enforcers "lazily" (i.e., lazy, on-demand enforcement) by adding the enforcer when adding a parent node that requires a particular property. Alternatively, an optimizer may place enforcers "eagerly" when adding child nodes to a plan. In either case, only the cheapest existing plan (sub-plan) will receive the enforcer. Other enforced plans are pruned out given that both the cheapest existing plan and other more expensive plans have the same enforced property. The cheapest plan will be generated by applying the enforcer to the cheapest non-enforced child as the enforcer's cost is assumed to be the same for any child in the equivalence class (Eqc).

Lazy, on-demand enforcement places an enforcer when a parent needs a child to have a given property. The cost of the enforced cheapest child is compared with the cost of the cheapest child already having the needed property, if any. The alternative with the lowest overall cost is selected. Consider, for instance, merge joins and their ordering requirements. Given the directed acyclic graph (DAG) structure of the plan cache, an enforcer will be generated and costed for each parent of a given plan. When several parents have different ordering needs, each will add its own enforcer.

The method of the present invention for eager property enforcement places an enforcer in advance (a priori) when a new cheapest plan is added to an equivalence class. With this approach, no enforcer needs to be added when a parent looks for a child node, as the enforcer is already present. Eager property enforcement relies upon knowing in advance the needs of all possible parents of any plans in an Eqc. This is an enhancement of the known concept of "interesting properties" and an evolution of the Cascades keyless sort nodes. The approach of the present invention is to model the whole set of corresponding interesting physical properties with a logical property which is referred to as the "maximal useful property." As the maximal useful property is used to represent the physical property of the enforcer, it shares the same representation as the underlying physical property. The maximal useful property is used to represent an available property and can be compared, propagated, and so forth. The difference between the underlying (physical) property that is needed and its corresponding (logical) maximal useful one purely lies in their semantics. The maximal useful property is known in advance (a priori) for an equivalence class. The needed/useful property is known after the fact (a posteriori), for a given plan of that Eqc.

The characteristics of a physical property for eager property enforcement can be summarized as follows. The maximal useful property for a given Eqc is a meaningful concept. The maximal useful property is inexpensive to compute, represent, and use. In addition, enforcing a stronger property is (almost) as expensive as enforcing a cheaper one. Eager enforcement is not bound to a specific search engine style (top-down vs. bottom-up, rule-based or not). Eager enforcement only needs the optimizer to implement concepts similar to equivalence classes and logical properties (which most modern optimizers do implement). Eager enforcement can be easily inserted at the place (or places) where the search engine adds new plans to an equivalence class. The application of this concept to ordering will now be described.

2. The Ordering Representation

An ordering can be available on more than one column. The ordering provided by the scan of a multi-column index has a fixed, major to minor, index key column sequence. This is referred to as a "vector ordering" and identified by using the notation: (c1, c2, c3) where $c_i$ are attributes. Conversely, the ordering needed for grouping with several GROUP BY columns has no fixed major to minor sequence. A sequence must be selected for the QEP (i.e., the final query to be executed), but any of the alternatives may be used for purposes of optimization. This is referred to as a "set ordering" and identified by using the notation {c1, c2, c3}. In addition, an available set ordering can be constrained to have a subset of columns first. For instance, if the child of a group ordered operator has a {c1, c2, c3, c4} ordering and the grouping is on c2 and c4, then the result would need c2 and c4, in any sequence, to precede c1 and c3. This is called a "mixed ordering" and identified using the notation ({c2, c4}, {c1, c3}).

Both set orderings and mixed orderings are compact, folded representations that are compatible with a number of vector orderings. This means that an available set ordering is sufficient if any of its "vector ordering instantiations" is needed. Likewise, when a set ordering is needed, the availability of any of its instantiations satisfies the requirement. For instance, the {c1, c2, c3} set ordering has all n! (n factorial) permutations of its three columns as vector ordering instantiations:

(c1, c2, c3), (c1, c3, c2), (c2, c1, c3),
(c2, c3, c1), (c3, c1, c2), (c3, c2, c1).

The optimizer of the currently preferred embodiment uses a richer ordering representation that also covers ascending/descending orders and collating sequences. The system also implements other order simplification techniques, such as column equality transitive closures. For additional information on other order simplification techniques, see e.g., R. P. Kooi, "The Optimization of Queries in Relational Databases," PhD Thesis, Case Western Reserve University, 1980. See also e.g., the abovementioned "Fundamental Techniques for Order Optimization."

3. Applying Eager Enforcement to Ordering

A "set ordering" is the compact representation of the "maximal useful ordering" that is needed for eager property enforcement. A set ordering is introduced as a physical property, to represent the ordering needs of the group ordered algorithm. But a set ordering also represents the ordering made available by a sort node (i.e., a sort operator), which is the order enforcer. Indeed, unlike a B-tree index that makes available the vector ordering determined by its key, the same sort can be used during the optimization to represent any ordering on its attributes.

The eager enforcement requirements with respect to this ordering representation can be summarized as follows. The maximal needed ordering of an Eqc is the set of projected columns that are in an equi-join yet to be applied, in a grouping yet to be applied, in an ORDER BY clause, under a scalar min( )/max( ) aggregate, below a UNION, or in a SELECT DISTINCT select list. FIG. 5 illustrates the needed orderings for each exemplary equivalence class for the sample query shown above in Example 1. This set ordering is cheap to compute, represent and use. The cost of a sort operation is mainly given by the input/output (I/O) cost, which is based upon the volume of data to sort. The cost of the sort operation is largely insensitive to the size of the sort key. Eager enforcement can thus be applied to ordering. Its implementation in any search engine implies minimal changes to logical property computation and to adding new plans to an equivalence class. It also enables simplification of valid child lookup as this will no longer require enforcers management.

4. Components of the Currently Preferred Embodiment

Figure 7:
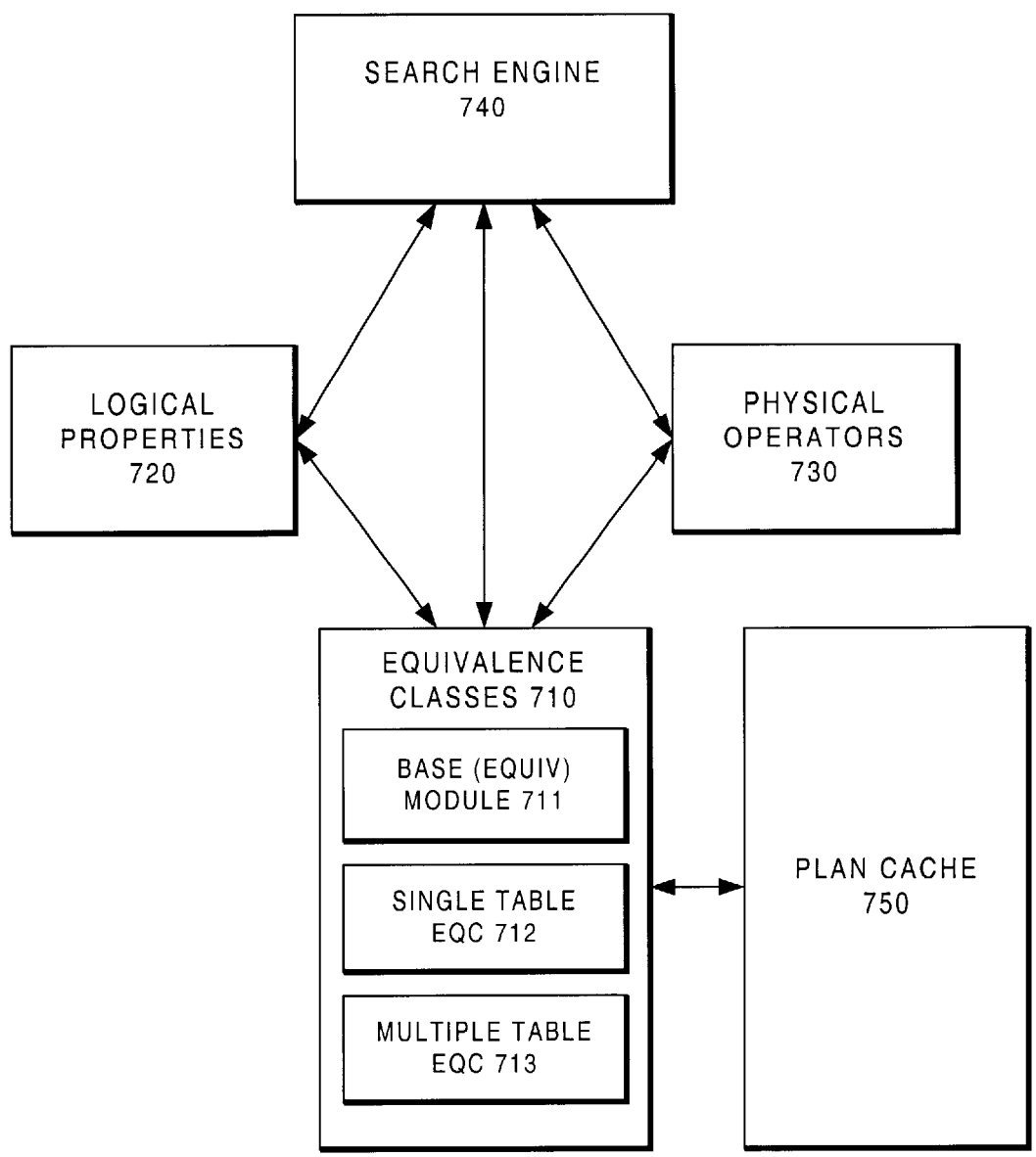
FIG. 7 is a block diagram illustrating components of the system of the present invention, which in its currently preferred embodiment is implemented as part of the optimizer of a relational database management system.

FIG. 7 is a block diagram 700 illustrating components of the system of the present invention, which in its currently preferred embodiment is implemented as part of the optimizer of a relational database management system. As shown, the system includes equivalence classes 710, a logical properties module 720, a physical operators module 730, a search engine 740, and a plan cache 750. The plan cache 750 stores equivalence classes created for a query.

The equivalence classes 710 is a data structure that describes a set of sub-plans. Each of the sub-plans in the same equivalence class references the same set of underlying database tables. For instance, two sub-plans joining the same two tables are in the same equivalence class. Each sub-plan in an equivalence class competes with other sub-plans in the same equivalence class to be part of the total (final) plan generated by the optimizer. In the currently preferred embodiment, the equivalence classes 710 include a base (or equiv) module 711, a single table Eqc (Eqc1) module 712, and a multiple table Eqc (Eqcn) module 713. Single table Eqc module 712 contains plans over a single table (such as index scan or table scans and the enforcers of those scans of the table). The multiple table Eqc 713 holds sub-plans joining together a plurality of tables. Sub-plans retained in multiple table Eqc module 713 would typically have a join node or an enforcer at the root node (such as a sort operator).

The logical properties module 720 includes a set of logical operators (or log props) which describe (a priori) the common behavior of a set of sub-plans that refer to these operators. Before enumerating a sub-plan or plan fragment, several things about the sub-plan can be determined from examination of the equivalence class containing the sub-plan. One of the characteristics of sub-plans in the plan cache 750 that can be determined in advance (a priori) is the set of underlying tables referenced by the sub-plans. Because an equivalence class is characterized by an underlying set of tables, these tables are trivially known for all of the sub-plans in each equivalence class. In addition, the available columns (or attributes) are known. The available columns can be determined as the union of all of the columns of all of the underlying tables. Of particular interest to the present invention, the logical properties can be computed (determined) a priori before sub-plan enumeration. This allows sub-plan enumeration to be based upon the available, computed logical properties.

Unlike the logical properties, the physical properties are specific to a given plan—a given physical implementation of a plan fragment or sub-plan. For instance, whether or not an ordering is available in the result of a physical operator depends upon whether the physical plan has a sort or an index scan providing an ordering and the ordering is retained (not lost). In other words the physical properties are a postiori, meaning that they are only known for a given plan or sub-plan once it has been built.

The physical operators module 730 describes the hierarchy of each of the physical operators. The physical operators module implements optimization time physical operators that are used for the optimization of the Volcano runtime iterators. They are not themselves runtime iterators that implement the open/next/close protocol. Rather, the physical operators module 730 contains optimization time descriptions of those runtime iterators which are used for evaluation and costing during the optimization process. These optimization time physical operators contain a description of the physical properties, such as the ordering, the partitioning, and the need for distinctness and grouping enforcement. These physical operators are nodes in a tree that have children. A tree of physical operators is a sub-plan or the full (final) plan. A plan is the full plan if it covers the total semantics of the query (i.e., if the result set of the root node of the plan tree delivers the result set of the query).

In the currently preferred embodiment, the optimization time nodes and the query execution time nodes are implemented using two different types of data structures. Different data structures are used because of differing needs during query optimization and query execution. For instance, the execution time nodes implement the open/next/close interface, while the optimization time nodes (i.e., the optimization time physical operators referenced above) handle different requirements such as costing, supplying available properties, and computing available properties. In addition, the number of nodes in the final query execution tree is typically much smaller than the number of nodes that must be examined during optimization. Accordingly, it is advantageous to have the smallest possible operators (nodes) during the optimization process.

The search engine module 740 inspects a search space of possible plans and plan fragments (or sub-plans) in order to determine the most cost-effective query execution plan for execution of a given query. The search engine module receives as input a logical operator tree consisting of a tree of logical relational operators. The search engine 740 generates a physical operator tree as output. The physical operator tree that is generated is the best plan determined based upon the optimizer's cost model and the area of the search space inspected by the search engine. This best plan may then be used by the code generator (not shown at FIG. 7) to generate the execution plan for execution against the database. In the currently preferred embodiment, this execution plan is a Volcano iterator tree.

As previously described, the search engine of the currently preferred embodiment is a depth-first search engine. A breadth-first search engine (such as IBM System R for example) starts by processing all of the one table equivalence classes, then proceeds to processing all of the two table equivalence classes, as so on. In contrast to the operations of a breadth-first search engine which exhaustively processes each level in the plan cache 750, the depth-first search engine of the currently preferred embodiment attempts to develop a full plan (i.e., a plan covering all tables) more rapidly. After evaluating the single table equivalence classes, the depth-first search engine combines two of these equivalence classes to enumerate a single two-table equivalence class. The depth-first search engine then immediately moves up a level in the plan cache by adding another single table equivalence class to the two-table equivalence class to generate a three-table equivalence class. In this manner, the depth-first search engine proceeds to try and develop a full plan before evaluating each and every combination at each level of the plan cache. After a full plan has been developed, the depth-first search engine then goes back and considers other alternative combinations that may result in a more efficient query execution plan.

The depth-first search engine of the currently preferred embodiment is a permutation-based engine that incrementally generates permutations of the base tables to be joined together. For example, if a given query references tables R, S, T, the search engine would start by joining tables R and S and then joining table T for a full permutation. Then the engine backs out by abandoning table T and looks for another permutation starting with R and S. In this example, there is no other combination starting with R and S, so the search engine backs out again to determine if there is another permutation starting with R. In this case there is another possibility, the tables R and T can be joined and then S added for a second full permutation (R, T, S). This process of permutation mapping typically continues until all permutations are enumerated. During this process, the search engine is driving the equivalence classes by joining them together using a depth-first strategy. The methods of the present invention for eager property enforcement and opportunistic property enforcement during the optimization process will now be described in more detail.

5. Method Steps for Eager Property Enforcement

Figure 8A:
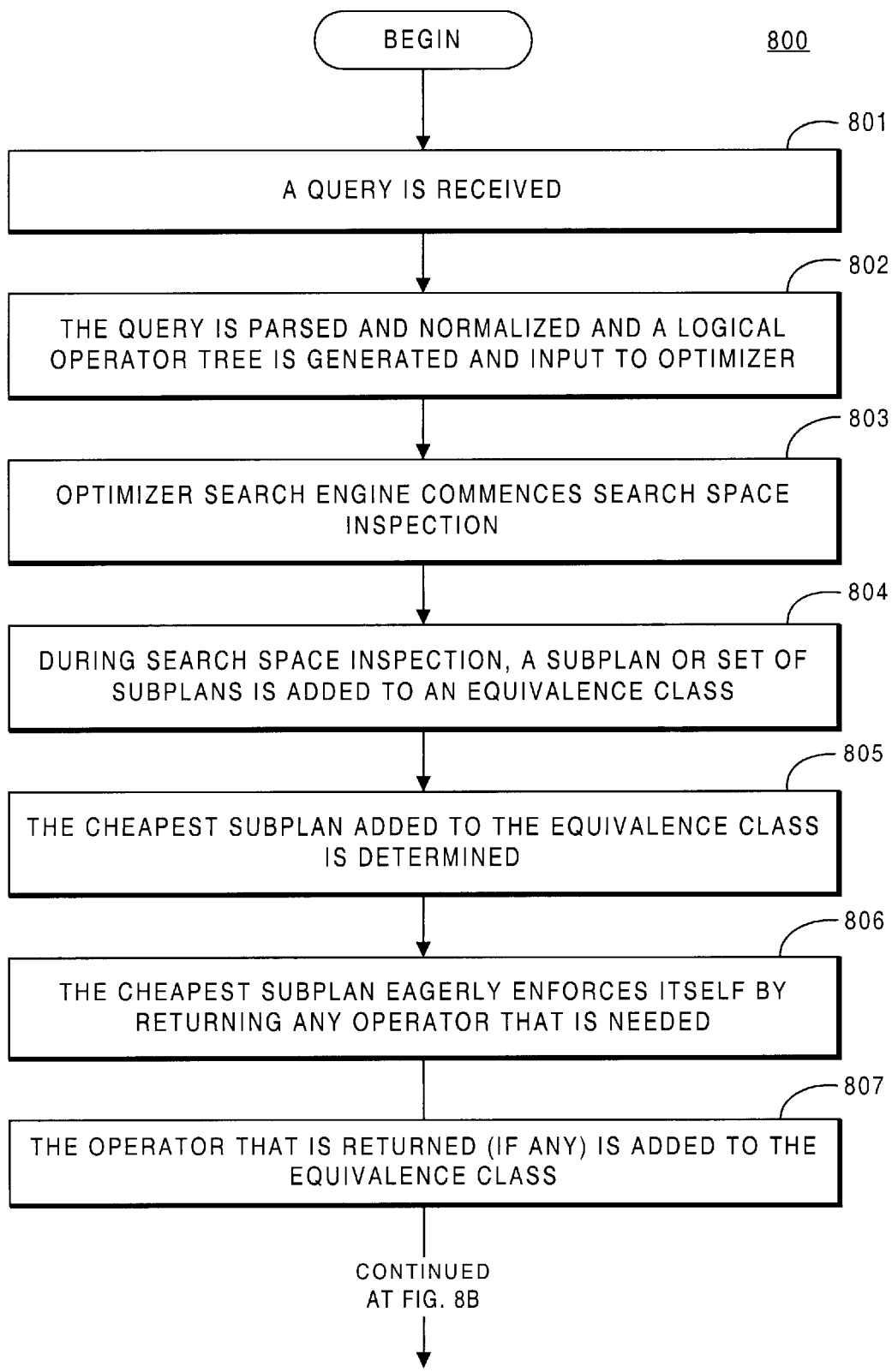
FIGS. 8A–B comprise a single flowchart illustrating the detailed method steps of the operations of the present invention for the application of eager enforcement to ordering.
Figure 8B:
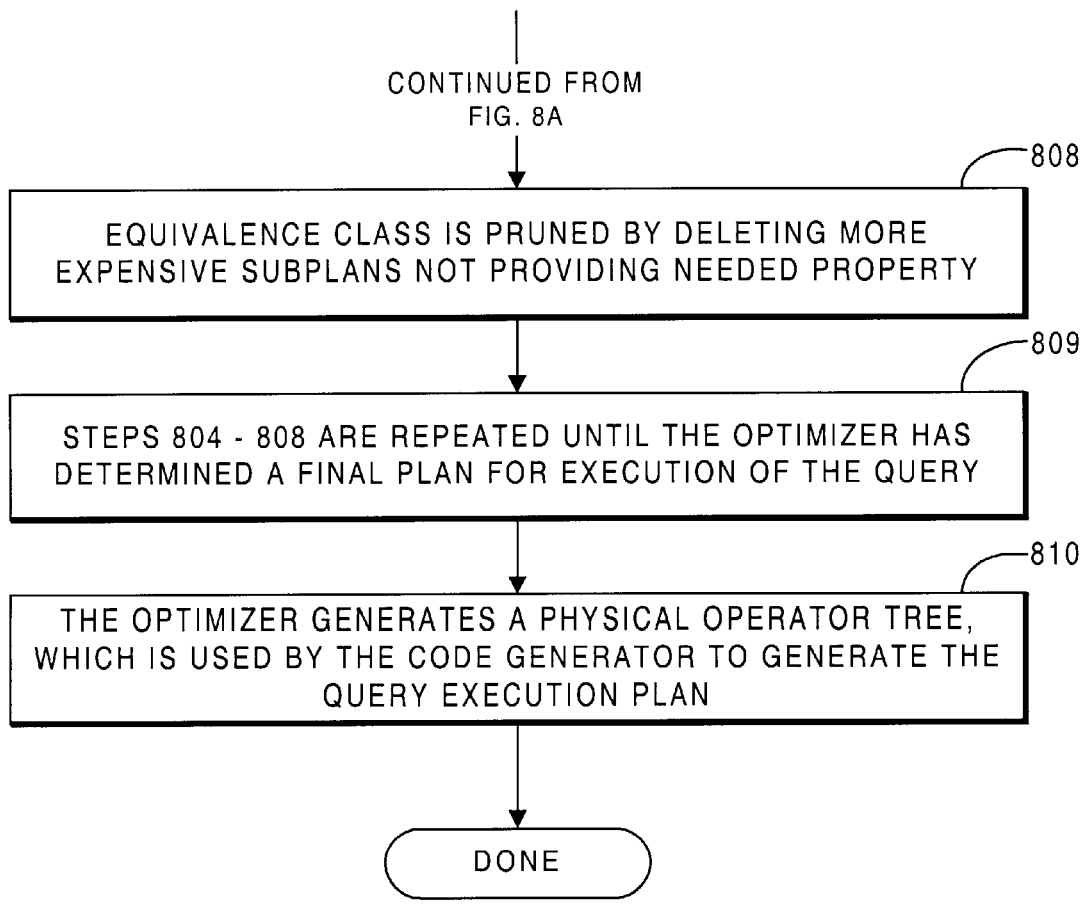

FIGS. 8A–B comprise a single flowchart 800 illustrating the detailed method steps of the operations of the present invention for the application of eager enforcement to ordering. In this example, an SQL query containing an ORDER BY clause is used as an example to illustrate the operations of the present invention. However, the methodology of the present invention is also useful for optimization of a wide range of queries and is not limited to use in this context. In addition, the currently preferred embodiment uses a bottom-up, depth-first search engine. However, the system and method of the present invention may also be used with other types of search engines as previously explained. The method steps described below may be implemented using computer-executable instructions, for directing operation of a device under processor control. The computer-executable instructions may be stored on a computer-readable medium, such as CD, DVD, flash memory, or the like. The computer-executable instructions may also be stored as a set of downloadable computer-executable instructions, for example, for downloading and installation from an Internet location (e.g., Web server).

As shown, the method commences at step 801 with the receipt of a query (e.g., an SQL query). The SQL query may, for example, include a SELECT statement on a customer table, with a WHERE clause and an ORDER BY clause requesting ordering by customer name. At step 802, the query that is received is parsed and normalized and an internal representation of the query is generated as a logical operator tree. This logical operator tree is a tree whose nodes are pure logical relational algebra operators, such as join, group, or union for example. However, operators such as nested loops join and merge join are not included in the logical operator tree as they are not pure logical relational algebra operators. The logical operator tree that is generated is input to the optimizer.

After the optimizer receives the logical operator tree as input, at step 803 the search engine module of the optimizer commences inspection of the search space of possible plans and plan fragments in order to determine the most cost-effective query execution plan. As described above, search space inspection involves transforming the initial query expression into a physical operator tree. This transformation includes reordering expressions using algebraic rules, replacing the logical operators with the physical operators that implement them, and enforcing the properties needed by some algorithms. During search space inspection, the search engine typically visits each multi-table equivalence class more than once as described below. As previously described and illustrated at FIG. 4, an equivalence class is identified by its set of underlying tables and contains sub-plans (or plan fragments) which compete with each other to be part of the best total plan. Each time a multi-table equivalence class is visited, at step 804 a sub-plan or set of sub-plans is added to the equivalence class. The same process also applies in the case of single table equivalence classes. However, each single table equivalence class is only visited once for the purpose of adding sub-plans.

After one or more new sub-plans have been added to an equivalence class, the equivalence class is eagerly enforced. Eager enforcement means that the optimizer will try to place the strongest possible enforcer over the cheapest new sub-plan added to the equivalence class. In the currently preferred embodiment, the list of new sub-plans added to the equivalence class is traversed and, at step 805, the cheapest sub-plan added to the equivalence class is determined. This determination is based upon the cost of each sub-plan in the equivalence class according to the optimizer's cost model.

After the cheapest new sub-plan in the equivalence class has been determined, at step 806 that cheapest sub-plan eagerly enforces itself by (if necessary) returning an operator that is the eager enforcer that is needed. The method for determining whether or not a particular sub-plan requires an eager enforcer is described below in more detail. At step 807, the operator that is returned is added to the equivalence class. The equivalence class retains both the cheapest sub-plan that is not eagerly enforced as well as the eagerly enforced sub-plan. This results in an increase in the search space. However, this search space increase cannot be avoided as some parent equivalence classes do not need the enforced property and should be able to use the cheapest sub-plan without the eagerly enforced property.

At step 808, the equivalence class is pruned by deleting sub-plans that are more expensive than the cheapest sub-plan and that do not provide a needed property (e.g., a needed ordering). A sub-plan that is not the cheapest may be retained if it provides a needed property. Also, as described above, the revised equivalence class may contain both the cheapest sub-plan without the eagerly enforced property as well as one or more sub-plans which enforce a needed property. The revised equivalence class is retained in the plan cache, which is a directed acyclic graph of the set of candidate sub-plans that are competing to be included in the best total plan being generated by the optimizer.

At step 809, the above steps 804-808 are repeated until the optimizer has determined a best final plan for execution of the query. At step 810, the optimizer generates a physical operator tree as output. This physical operator tree is the best plan that is determined to be available according to the optimizer's cost model and the area of the search space inspected by the optimizer. The best plan that is determined by the optimizer is then used by the code generator to generate the query execution plan, which in the currently preferred embodiment is a Volcano tree of runtime operators. The foregoing steps will now be explained and illustrated using a sample query.

6. Optimization of a Sample Query

As previously described, the currently preferred embodiment of the present invention utilizes a depth-first, bottom-up search engine. When a parsed, normalized query is received by the optimizer (i.e., as a logical operator tree) the depth-first, bottom-up search engine of the currently preferred embodiment proceeds to generate a physical operator tree for execution of the query by starting with solutions (i.e., sub-plans or plan fragments) for small portions of the query and gradually using these plan fragments to construct larger solutions (i.e., larger sub-plans or the final plan). For instance, the search engine typically starts with sub-plans scanning single tables and uses these single table sub-plans to build larger plans joining two tables, and then three tables, and so forth until a final plan joining together all of the tables is completed.

In any search engine, whether top-down, bottom-up, depth-first or breadth-first the search engine typically visits each equivalence class more than once during this process of search space inspection. Equivalence classes referencing only a single table are an exception to this general rule. Single table equivalence classes are not really part of the search space inspection since there are as many of these equivalence classes as there are underlying tables referenced by the query. Accordingly, the search engine usually visits single table equivalence classes only once. However, multiple table equivalence classes which join together several tables are usually visited by the search engine a number of times. For instance, in the above example of a query referencing tables R, S, T, the equivalence class of R, S will be visited at least twice. It is visited once for the R, S, T permutation. It is visited a second time for the S, R, T permutation. As a result, plans in an equivalence class that join together S and R would be visited and added to the equivalence class for both the permutation R, S, T as well as for the permutation S, R, T. In this manner, a search engine typically visits each multi-table equivalence class several times for depth-first descent into the search space for different combinations and permutations.

Property enforcement is articulated at the point in the optimization process where a sub-plan or set of sub-plans is added to a multi-table equivalence class. The approach of the present invention is to eagerly enforce each equivalence class by placing the strongest possible enforcer over the cheapest new sub-plan added to the equivalence class. This involves two steps. First, the cheapest sub-plan added to the equivalence class is determined by traversal of the equivalence class. The determination of which sub-plan is the cheapest (i.e., has the lowest execution costs) is based upon the cost of each sub-plan in the equivalence class according to the optimizer's cost model. Use of a depth-first, bottom-up optimizer means that each of the sub-plans in an equivalence class has been fully costed. Accordingly, the costing decision is made based upon readily available information.

To illustrate this process, consider the same example of an SQL query including a SELECT statement on a customer table, with a WHERE clause and an ORDER BY clause requesting ordering by customer name. This query results in a single table equivalence class as the above query refers to only the customer table of the database. This exemplary equivalence class also has a logical property called needed ordering. The needed ordering logical property contains a set of columns with a single column (customer name in this example) by which the information is to be ordered. This equivalence class also contains several sub-plans. For example, these sub-plans may include a table scan of the customer table. Another sub-plan might be an index scan using an index on the customer name column of the table. A third plan is an index scan on another index that is relevant to the WHERE clause of the query. In this example, the cheapest plan may be the index scan on the index relevant to the WHERE clause of the query.

Each of the operators in the list of sub-plans in the equivalence class would have a physical property which is called available ordering. The available ordering physical property of the table scan would have nothing (NULL), as the table scan does not provide an ordering. The index scan on the customer name column would have an ordering on this column. Similarly, the other index scan relevant to the WHERE clause would also have an ordering. Accordingly, these two exemplary index scan sub-plans would have an available ordering property (e.g., as a set or vector of columns) that may be useful for optimization of this query. The needed ordering logical property which is required in accordance with the methodology of the present invention is always a set ordering because at optimization time the ordering (e.g., the ordering of these two columns in this example) is not relevant to optimization of the query. The decision about whether the ordering should be column 1, then column 2 or, alternatively column 2 and then column 1 can be deferred until later in the optimization and code generation process.

This ability to defer this decision about ordering is an important point because of the directed acyclic graph structure of the plan cache. The same sort node may be a child of several parent nodes. Although each of these parent nodes may require a different actual ordering, they are compatible with the set ordering provided by the sort for purposes of query optimization.

After the cheapest new sub-plan in the equivalence class has been determined, the cheapest sub-plan eagerly enforces itself by returning any eager enforcer that is needed. The operator that is returned is then added to the equivalence class. For example, when the sub-plan is added to the above-described equivalence class, a sort may be added over the cheapest plan in the equivalence class, which might be one of the two sub-plans containing an index scan as previously described. Eager enforcement includes identifying the cheapest sub-plan in the equivalence class and requiring that cheapest sub-plan to eagerly enforce itself if necessary. The process of determining whether or not an enforcer is necessary is described below. In this example, the sub-plan may eagerly enforce itself by returning a sort operator which is added above the cheapest sub-plan in the equivalence class.

After any required eager enforcers have been added, the equivalence class is pruned by deleting sub-plans that are more expensive than the cheapest sub-plan and that do not provide a needed property (e.g., a needed ordering). A sub-plan that is not the cheapest may be retained if it provides a needed property. For instance, if the first index scan in the above example is more expensive because it cannot be used with the WHERE clause, but it does provide a needed property (e.g., an ordering that is useful) it will be retained in the equivalence class. Conversely, the table scan in this example will be discarded as it is the most expensive and it does not provide any ordering. After one or more operators are added to the equivalence class to eagerly enforce needed properties and unnecessary sub-plans are pruned, the revised equivalence class is added to the plan cache. In the currently preferred embodiment, the plan cache is implemented as a directed acyclic graph which contains the set of candidate sub-plans that are competing to be included in the best total plan being generated by the optimizer.

7. Determining Whether an Eager Enforcer is Required

The method for determining whether or not a particular sub-plan (i.e., the cheapest sub-plan) needs an eager enforcer will now be described. Eager enforcement is based upon the fact that it can be determined in advance, as an equivalence class logical property, whether or not some ordering is needed in an equivalence class. If no ordering is needed for an equivalence class, then the method for determining whether an eager enforcer is required returns a NULL. In this situation there is no need to add a sort as no ordering is needed (i.e., no needed ordering) for the equivalence class.

On the other hand, if a needed ordering is required, a check is made to determine whether or not the ordering is already available. If the needed ordering is already available, there is no need to add a sort operator to the sub-plan. Similarly, if the cheapest sub-plan has an ordering at least as strong as the needed ordering, then the method returns NULL as there is no need to generate an enforcer. For instance, using the same example of a query with a WHERE clause and an ORDER BY clause, the index scan on the column may be the cheapest sub-plan if both the WHERE clause and the ORDER BY clause are on this same column. If this is the cheapest sub-plan, this sub-plan is instructed to eagerly enforce itself. In this example, the available ordering property of this sub-plan is compared to the needed ordering that is required. If the available ordering satisfies the needed ordering requirement, there is no need to add a sort operator to the equivalence class. However, if the WHERE clause is on one column and the ORDER BY clause is on another column of the database, the cheapest index scan may be an index scan on the WHERE clause. In this situation, this index scan does not provide the required needed ordering, so a sort operator providing the required ordering is generated and returned as an enforcer. This sort operator is then added to the equivalence class above this sub-plan.

8. Needed Ordering Logical Property is a Set Ordering

It should be noted that the needed ordering logical property is a set ordering. As previously described, the actual physical ordering that is required does not need to be determined at the time of query optimization. This is one of the strengths of the present eager enforcement method. The set ordering (e.g., column 1, column 2) is enforced; however for purposes of optimization these columns can be in any order. The enforcer that is the sort is providing a set ordering and not a vector ordering. The sort physical operator can be instantiated after optimization with the ordering that is actually required in the final plan.

This approach greatly simplifies the optimization process and avoids expanding the search space for each and every ordering that may be required. Instead, a single sort node with a set ordering may be used as the child of multiple parents in a query where multiple tables are being joined. For example, several join nodes in an equivalence class which compete with each other may be over the same child sort operator. The method of the present invention avoids the expansion of the search space that would result from using a different child sort node for each of the parent nodes. The use of a set ordering also enables the eager enforcement framework to be used for opportunistic enforcement of grouping as hereinafter described.

9. Parallel Queries

If a query only requires the enforcement of ordering of a serial query, a maximum of one node is added to an equivalence class as the ordering enforcer. However, if a parallel query is being optimized, then in addition to the ordering enforcer, a partitioning enforcer (Xchg), or the combination of ordering and partitioning (a sort over an Xchg) may be added to the equivalence class.

10. Application to Multi-Table Equivalence Classes

In the case of a multi-table equivalence class including join nodes which join a plurality of tables, nested loops joins and merge joins will also be generated. A merge join is a join algorithm that needs its children to be ordered on the merge predicate. Historically search engines typically handle merge joins by obtaining the cheapest plan that has the needed ordering while also adding a sort over the cheapest plan that has been found in the child equivalence class to make sure that the required ordering is available. As a result, for each and every merge join added by parent equivalence classes in existing search engines, a sort operator must be added to the child equivalence classes, which includes costing this operator, computing its properties, and so forth. With the present eager enforcement method, this is no longer required.

With eager enforcement, the sort operator is already available in the child equivalence class, because it was placed there previously, if required, when the sub-plans were added to the child equivalence class. In the system of the present invention the merge join only requires checking to verify that the properties in the child equivalence classes match and that sufficient ordering is available to perform the merge join. This enables stronger pruning and avoids unnecessarily costing and computing a number of merge joins that will be discarded later in the optimization process. This approach also simplifies the valid child lookup process. As enforcers are already available in child equivalence classes, management of enforcers is no longer needed.

E. Opportunistic Property Enforcement

1. Overview of Opportunistic Property Enforcement

The opportunistic enforcement method of the present invention takes advantage of the available eager enforcement framework to handle additional property enforcement requirements in a very efficient manner. This opportunistic enforcement methodology requires only a very small increase in the search space during query optimization. The approach of the present invention is to take advantage of existing properties, such as when particular data is already ordered. For example, if data is already ordered on the grouping columns, grouping the ordered data is a very efficient operation that requires very little increase in query execution cost (compared to not grouping the ordered data). The opportunistic enforcement method also takes advantage of the enforcement process itself. For instance, when a sorting operation is being performed to obtain an ordering it is advantageous to also handle grouping at the same time if grouping is required. For example, if a sort operator is being added to an equivalence class and grouping is also needed, a group sorting operator may be used instead of the sort to obtain the required result with lower overall query execution costs.

As previously described, logical properties may be computed in advance (a priori) for an equivalence class. Among the logical properties that may be computed a priori is grouping. A group needed logical property of an equivalence class indicates whether or not grouping is needed for that equivalence class. If grouping is required, the present opportunistic property enforcement methodology modifies the eager enforcement process at two points to perform the required grouping operations in an advantageous manner.

The first point for application of the present opportunistic enforcement method is when new sub-plans (physical plans) are being added to an equivalence class. When new sub-plans are evaluated to determine which sub-plans are the most advantageous (e.g., cheapest) to add to an equivalence class, a determination is made as to whether any of these sub-plans provides a needed grouping. Initially, a check is made as to whether grouping is needed at the Eqc. If no grouping is needed, then the normal eager enforcement process (described above) proceeds without any modification. However, if grouping is required at this Eqc, then the sub-plans being added are next evaluated to determine if any sub-plan already provides an ordering on the grouping columns. For instance, if a sub-plan includes an index scan, this sub-plan may include a grouping on an index column which provides the required grouping. As another example, a sub-plan may include a merge join, with the merge predicate a superset of the grouping column. In these examples the needed ordering is already available and no sorting operation is required. If a sub-plan provides a needed ordering and grouping is required, a group ordered operator is added above the sub-plan. The group ordered node that is added results in little or no increase in query execution cost as this operator works on the fly without requiring any input/output operation.

This newly modified sub-plan, which includes a parent property enforcer (group ordered) over the original sub-plan, replaces the original sub-plan in the Eqc. For example, if a sub-plan is a merge join providing a needed ordering, a group ordered operator is placed over the merge join and this modified sub-plan is added to the Eqc instead of the original sub-plan. Replacing the original sub-plan with the modified sub-plan provides the needed grouping while avoiding an increase in the search space that would result if both the original and the modified sub-plans were retained in the Eqc. This is different than eager enforcement method which retains the cheapest sub-plan and also adds a new sub-plan which adds a sort operator over the cheapest sub-plan.

The second point during which opportunistic enforcement may be applied during the eager enforcement process is the point at which a sort operator is being added to an equivalence class. When a sort node is being added above the cheapest sub-plan in an Eqc to eagerly enforce a required ordering, a determination is made as to whether or not grouping or distinctness are also needed at this Eqc. If grouping is needed, a group sorting operator is added to the Eqc instead of the sort, thereby enabling both ordering and grouping to be enforced at the same time. One advantage of this approach is that the group sorting operator that is inserted is more efficient than the sort. Another advantage is that an increase in the search space is avoided. Because a group sorting operator is added above the cheapest sub-plan in the Eqc, there is no need to add another sub-plan which enforces grouping to the Eqc.

It should be noted that the approach of the present invention may result in a slight increase in the search space by reducing pruning. As this method provides for tracking a grouping logical property, sub-plans which are not the cheapest plan in an Eqc, but which satisfy the grouping requirement, may be retained in an Eqc. This increase is usually minimal as sub-plans that provide a required ordering are typically the same as those that supply a required grouping. However, different rules may apply to ordering and grouping which may cause the parents of a given Eqc to lose an ordering or a grouping. Therefore, among the parents of a given equivalence class, some parents may retain the grouping and lose the ordering, while others may retain the ordering but lose the grouping. As a result, at a level above the current equivalent class, opportunistic property enforcement may result in slightly less pruning in certain circumstances. However, this slight increase is more than offset by the methodology of the present invention which avoids increases in the search space for eager/lazy aggregation.

2. Characteristics of Enforceable Property for Opportunistic Enforcement

As previously described, aggregation is an "enforceable logical property" and ordering, an eagerly enforced property, is important to group, the aggregation enforcer. The present invention introduces the concept of "opportunistic property enforcement" to model aggregation enforcement with minimal extra cost and minimal extra search space traversal relying on the available eager ordering enforcement. The characteristics of an enforceable property (OP) for opportunistic enforcement are as follows:

there is a logical property that describes whether an enforceable property (OP) is interesting to enforce at an Eqc;

there is another eagerly enforced property (EP);

while enforcing EP, OP can also be enforced at little or no additional cost (in terms of performance of the query execution plan);

when EP is available, there is a way to enforce OP at little or no additional cost; and the outcome of thus enforcing OP preserves the underlying eagerly enforced property (EP).

The application of this opportunistic property enforcement method to aggregation will now be described.

3. Aggregation as an Enforceable Property

For a given query that contains a GROUP BY, there are known transforms that indicate places in a query execution plan where aggregation is legal, see e.g., the abovementioned "Optimizing Queries with Aggregate Views"; the abovementioned "Orthogonal Optimization of Subqueries and Aggregation"; the abovementioned "SQL Query Optimization: Reordering for a General Class of Queries"; the abovementioned "Aggregate-Query Processing in Data Warehousing Environments"; and the abovementioned "Eager Aggregation and Lazy Aggregation." The focus of the present invention is not on these transforms per se; rather the method of the present invention uses them to guide optimization decisions based on places where aggregation is legal. These transformations are used to compute, as logical properties, the grouping columns and aggregation functions of the equivalence classes where enforcing the aggregation is legal and also to determine where the aggregation needs of the query are satisfied (i.e., where no further grouping is required to obtain the final grouping and aggregation values).

The approach of the present invention is to introduce a Boolean logical property that will be true for all equivalence classes (Eqcs) where aggregation is complete. In any Eqc where aggregation is legal, the set of grouping columns and the aggregation functions to be applied also needs to be computed. These are logical properties as the grouping transform preconditions depend only on the set of underlying tables, predicates, columns, and functional dependencies. The grouping transform preconditions do not depend on the actual physical operators and the plan formed by them. For the sample query previously illustrated in Example 1, these logical properties are shown on the last three rows of the table shown at FIG. 5. For instance, the global/local aggregation rules allow partial grouping and need extra count(*) aggregates to compute the final aggregation function values. For this, in Eqc {c,o}, c__co contains the counts of tuples in each group, using a sum (c__o) over the count (*) produced as c__o in Eqc {o }. Each and every scalar is computed a priori (i.e., not a part of the plan transformation, but as part of each Eqc logical property computation) and indicate how to group or sort within an Eqc, if ever the optimizer decides to place there a sort or group operator. The group relational operator and its group ordered and group sorting implementations are the enforcers of this property.

Likewise, each sub-plan in an Eqc contains a Boolean value that indicates whether aggregation is solved (either because they have a global group operator at the root, or because aggregation was enforced in some child and this grouping was preserved). This protects these sub-plans against cheaper peers during the competition amongst sub-plans in the equivalence class. Finally, some nodes require the grouping to be enforced. The top insert/update/delete/emit node of a complete plan needs its child to capture the full semantics of the query, hence grouping needs to be satisfied at this point. In some cases a parent vector or scalar aggregation that has a nested GROUP BY clause also requires grouping to be enforced.

4. Applying Opportunistic Enforcement to Aggregation

Opportunistic enforcement concepts may be applied to aggregation, as aggregation complies with the following opportunistic enforcement requirements:

An aggregation requirement is a logical property;

Ordering is the underlying eagerly enforced property;

group sorting is a cheaper version of sort that also enforces aggregation;

group ordered is a cheap aggregation enforcer when there is an ordering on the grouping columns; and Both of the above grouping operations preserve the ordering on the grouping columns.

5. Method steps for Eager and Opportunistic Property Enforcement

Figure 9A:
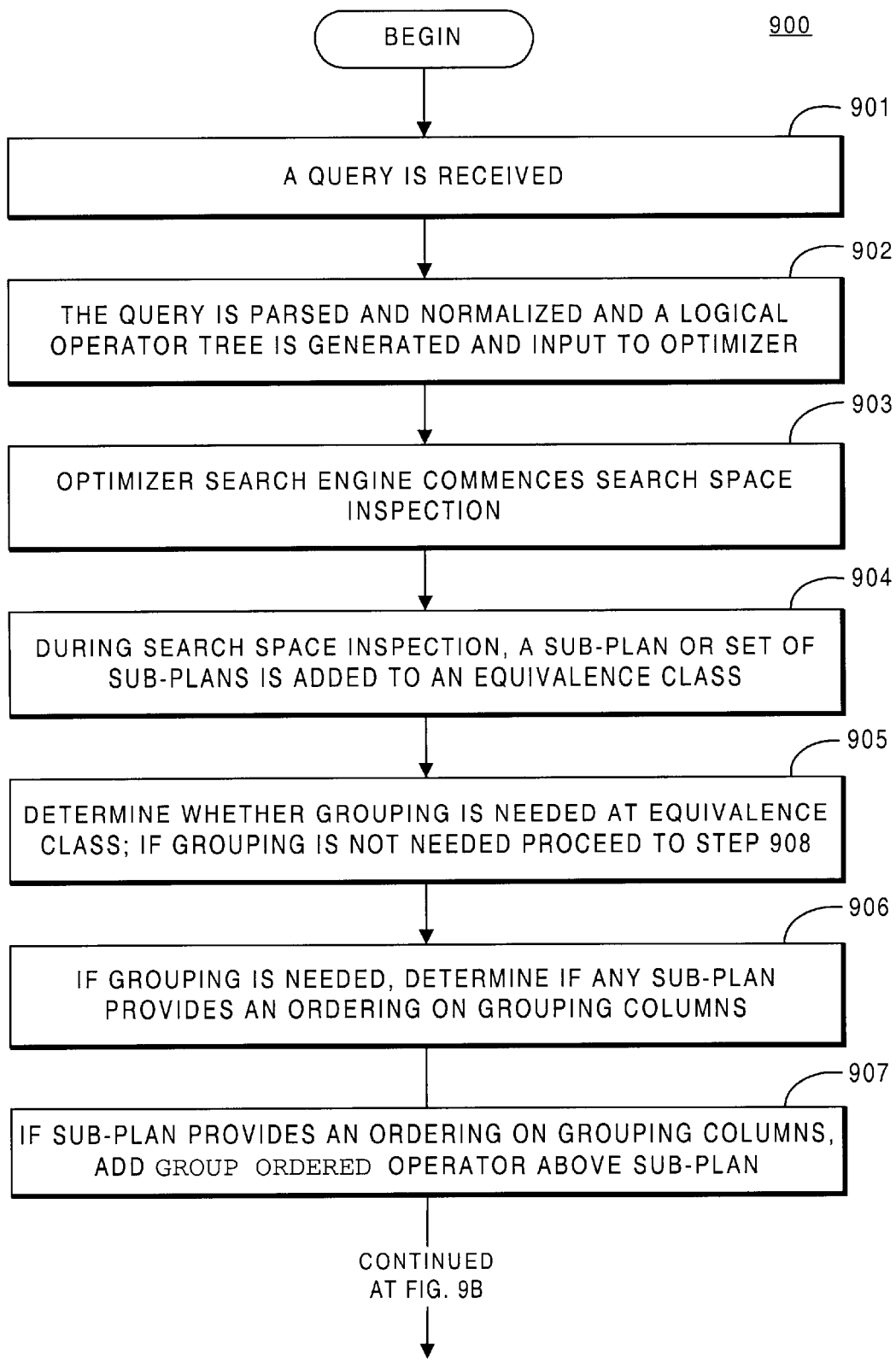
FIGS. 9A–B comprise a single flowchart illustrating the method steps of the operations of the present invention for eager and opportunistic property enforcement.
Figure 9B:
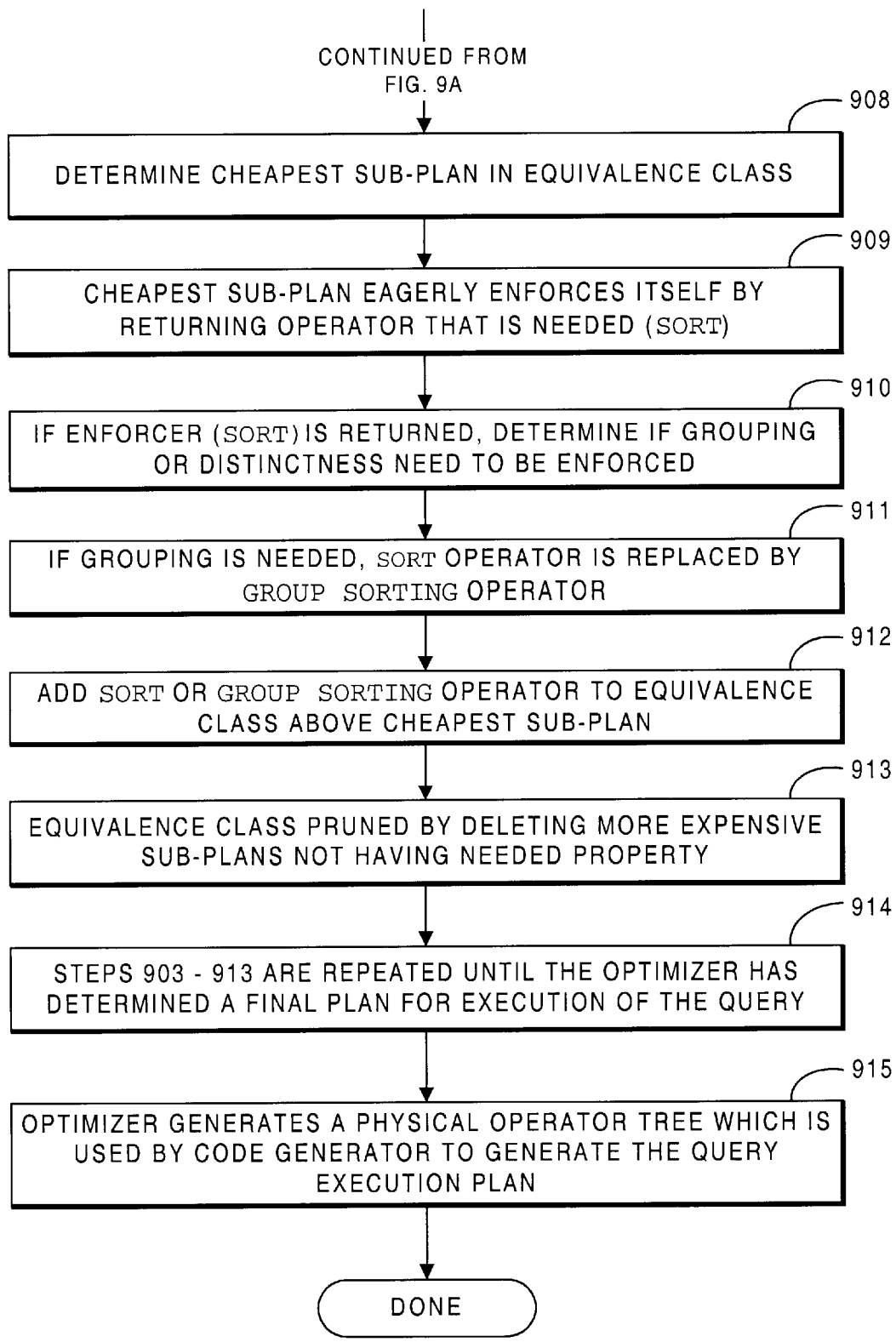

FIGS. 9A–B comprise a single flowchart 900 illustrating the method steps of the operations of the present invention for eager and opportunistic property enforcement. As previously described, the opportunistic property enforcement method of the present invention takes advantage of the above-described eager enforcement methodology. Accordingly, FIGS. 9A–B reflect modifications to the eager enforcement methodology to provide for opportunistic property enforcement. The method steps described below may be implemented using computer-executable instructions, for directing operation of a device under processor control. The computer-executable instructions may be stored on a computer-readable medium, such as CD, DVD, flash memory, or the like. The computer-executable instructions may also be stored as a set of downloadable computer-executable instructions, for example, for downloading and installation from an Internet location (e.g., Web server).

As shown, the method commences at step 901 with the receipt of a query (e.g., an SQL query). The SQL query may, for instance, require both grouping and ordering of the result. At step 902, the query that is received is parsed and normalized and an internal representation of the query is generated as a logical operator tree. The logical operator tree that is generated is input to the optimizer.

After the optimizer receives the logical operator tree as input, at step 903 the search engine module of the optimizer commences search space inspection. As described above, search space inspection involves reordering the logical operator tree using algebraic rules, replacing the logical operators with the physical operators that implement them, and enforcing the properties needed by some algorithms. During search space inspection, each time the search engine visits an equivalence class, at step 904 a sub-plan or set of sub-plans is added to the equivalence class. As one or more sub-plans are added to an equivalence class, the equivalence class is eagerly enforced and the opportunistic property enforcement method of the present invention is applied. As previously described, eager enforcement involves placing the strongest possible enforcer over the cheapest new sub-plan added to an equivalence class. As described above, each equivalence class is identified by its set of underlying tables and contains sub-plans (or plan fragments) which compete with each other to be part of the best total plan. Property enforcement is articulated at the point in the optimization process where a sub-plan or set of sub-plans is added to an equivalence class.

At step 905, a determination is made as to whether or not grouping is needed at an equivalence class. If grouping is not needed, the method proceeds to step 908 (i.e., normal eager enforcement process as previously described). However if grouping is required, at step 906 a determination is made as to whether any of the new sub-plans being added to the equivalence class already provides an ordering on the grouping columns. If a sub-plan provides an ordering on the grouping columns, at step 907 the sub-plan is modified by adding a group ordered operator above this sub-plan and this modified sub-plan is added to the equivalence class, replacing the original sub-plan.

At step 908, the list of new sub-plans added to the equivalence class is traversed and the cheapest sub-plan added to the equivalence class is determined. It should be noted that more than one sub-plan may be retained in the equivalence class. If the modified sub-plan providing grouping enforcement is not the cheapest plan, it is retained if there is no cheaper plan which provides the required grouping.

After the cheapest new sub-plan in the equivalence class has been determined, at step 909 the cheapest sub-plan eagerly enforces itself by (if necessary) returning an operator that is the eager enforcer that is needed. At this point the opportunistic property enforcement method may again be applied. If an operator (e.g., a sort operator) is required to be added for eager enforcement of ordering, at step 910 a determination is made as to whether or not grouping or distinctness need to be enforced at this equivalence class and whether the cheapest sub-plan has already solved this need. If neither grouping nor distinctness needs to be enforced or in the event that the needed grouping or distinctness is already provided by the cheapest sub-plan, then an ordering enforcer is returned and the method proceeds to step 912. This typically involves returning a sort operator to be added above the cheapest sub-plan in an equivalence class to enforce a required ordering.

If grouping or distinctness are determined to be needed at this equivalence class and the cheapest new sub-plan does not already provide it, at step 911 a group sorting operator is added to the equivalence class (instead of a sort operator) to enable both ordering and grouping to be enforced in the same sub-plan. The group sorting operator that is inserted is more efficient than the sort and also avoids an increase in the search space. At step 912, the operator that is returned (e.g., a sort or group sorting operator as applicable) is added to the equivalence class above the cheapest sub-plan.

At step 913, the equivalence class is pruned by deleting sub-plans that are more expensive than the cheapest sub-plan and that do not provide a needed property (e.g., a needed grouping). A sub-plan that is not the cheapest may be retained if it provides a needed property. After one or more operators are added to the equivalence class to eagerly enforce needed properties and unnecessary sub-plans are pruned, the revised equivalence class is retained in the plan cache.

At step 914, the above steps 903-913 are repeated until the optimizer has determined a best final plan for execution of the query. At step 915, the optimizer generates a physical operator tree as output, which is the best plan determined to be available based upon the optimizer's cost model and the area of the search space that was inspected. This physical operator tree is used by the code generator to generate the query execution plan.

It should be noted that sort is only replaced with group sorting when the grouping attributes are the same as the maximal useful ordering attributes. This is not always the case. For instance, when a HAVING clause contains an equi-join on an aggregation result, that column is part of the maximal useful ordering but not of the grouping. In this situation, a group sorting creates an ordering insufficient for a merge join on that column. Accordingly, sort is retained in this circumstance to comply with the opportunistic enforcement requirements.

The foregoing approach does not guarantee the generation of an optimal aggregation plan. There are a number of queries where the exhaustive application of grouping pushdown and pull-up rules will generate a better plan than the method of the present invention for opportunistic aggregation enforcement, but generating a better plan in this manner will be at the cost of a significant increase of the optimizer's search space. However, in most cases the method of the present invention for opportunistic aggregation enforcement allows the generation of good plans that aggregate at little or no additional cost (in terms of query execution) and with a minimal increase of the search space. As a result, the present approach is less limiting than the "greedy conservative heuristic" referenced in the abovementioned "Optimizing Queries with Aggregate Views."

Figure 10:
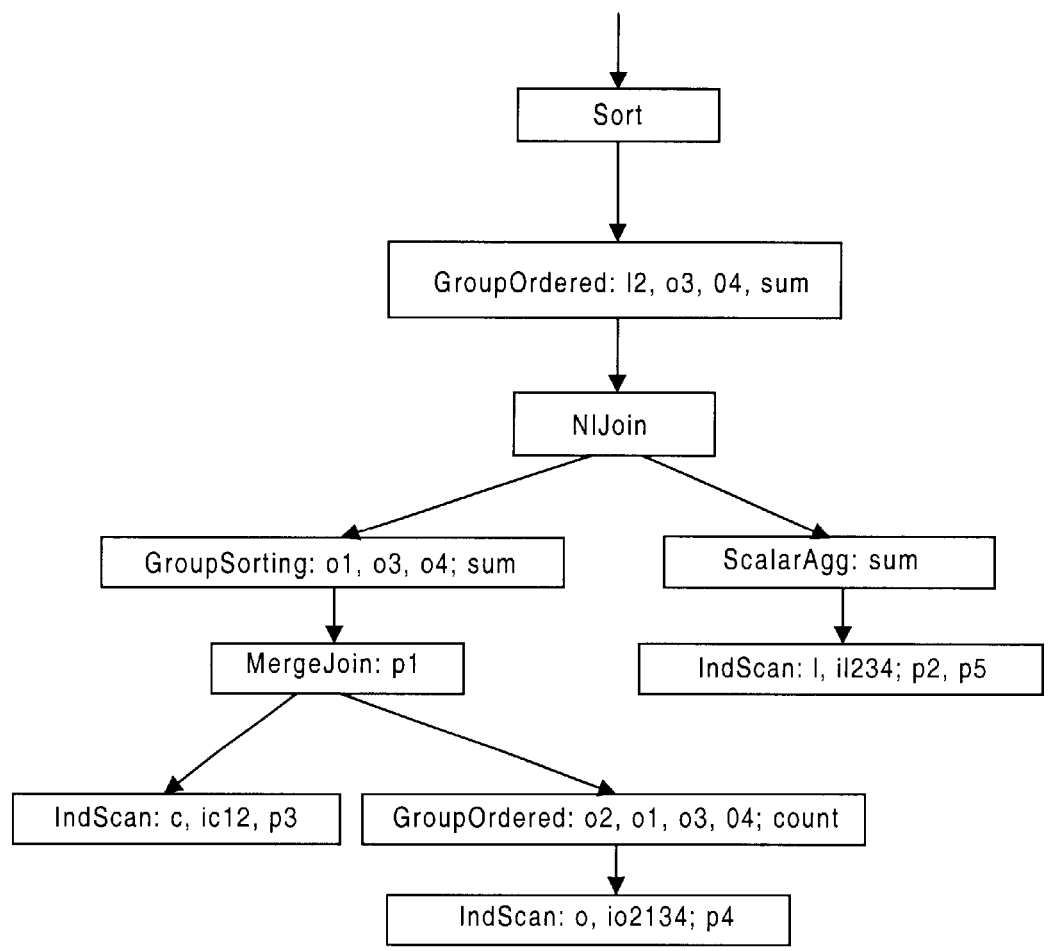
FIG. 10 illustrates an exemplary query execution plan for a sample query optimized using the methods of the present invention.

FIG. 10 illustrates an exemplary query execution plan for the above-described sample query optimized using the methods of the present invention. To illustrate the operations of the present invention, hash-based algorithms were avoided in this example. The incremental aggregation shown at FIG. 10 is obtained with a search space traversal similar to that required for the join enumeration. The group sorting operator which is shown at FIG. 10 under the N1Join was retained (even though N1Joins do not require an ordering) as it reduces the data set, while providing a useful ordering for the group ordered above the N1join node. This group sorting operator also gives a better buffer cache hit ratio to the N1Join's inner index scan. In addition, on the inner side of the N1Join, the group sorted operator becomes ScalarAgg due to the pushdown of the equi-join clause on the grouping column.

F. Abstract Plans Support

The logical properties introduced for eager ordering enforcement and opportunistic grouping enforcement are the basis of the abstract plan (AP) semantics and of its validity proof. Abstract plans are simplified relational algebra expressions that describe the query execution plan (QEP) that the optimizer is required to generate. FIG. 11 is an illustration of a sample abstract plan which describes the query execution plan shown in FIG. 10. In order to describe query execution plans, abstract plans need to be at the physical level. An AP must have an expressive power that goes beyond logical relational operators, such as join or group, and instead must specify a particular algorithm, such as merge join or group ordered.

As described in the abovementioned "User-Optimizer Communication using Abstract Plans in Sybase ASE," abstract plans (APs) can direct the optimization process. The AP is traversed in a bottom-up fashion and at each AP operator, the described node is constructed in the corresponding equivalence class. In addition, abstract plans do not describe scalars. Instead, abstract plans rely on the optimizer for handling scalars. Hence the sort AP operator does not give the sorting key and the group AP operators do not give the grouping columns and aggregation functions. The needed properties that are computed in the equivalence classes provide all required scalars.

When an abstract plan contains a sort, the maximal useful ordering of the Eqc of its child will be used for the sorting key. If this ordering is empty (i.e., if no ordering is needed), then the sort is considered as an error and no sort is generated. When an AP contains a group, the grouping related logical properties of its child's Eqc will be used for the grouping and aggregation function. If grouping is not legal in that Eqc, then it is considered as an error and no group is generated.

For instance, in FIG. 11, the sort at the top node of the abstract plan sorts on (s_13 desc, o3). The topmost group ordered node (i.e., the one which is immediately beneath the uppermost sort) groups on 12, o3, o4 and computes sum(s_l*c_co). These are the same values as previously illustrated in the last column of the table illustrated at FIG. 5. Because these properties are known a priori, they can be used before any plans are enumerated by the search engine (i.e., at the abstract plan directed plan construction time).

The AP validity proof is a constructive proof based on the logical properties that were calculated for the Eqcs. If an AP is compatible with all corresponding logical properties and is able to direct the construction of the plan, then the AP is valid. The same technique may also be applied for partitioning (enforced by Xchg) and distinctness, the other enforceable properties described by the AP technology. An AP can thus be used to describe a very broad range of plans, including: eager/lazy aggregation, parallel processing, and so forth. The AP can place group, sort, Xchg nodes anywhere within a bushy tree, provided that the plan must be legal (i.e., rely on properties known to the logical property module).

While the invention is described in some detail with specific reference to a single preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

What is claimed is:

1. In a database system, a method for eager ordering enforcement enabling improved query optimization, the method comprising:

receiving a query requesting data from a database, said query requesting ordering of data;

generating plan fragments for obtaining data requested by the query;

grouping said plan fragments into classes, said classes based upon tables of the database covered by each plan fragment;

for each class, determining a particular plan fragment having the lowest execution costs for obtaining data; and adding any required ordering enforcement operator to said particular plan fragment.

2. The method of claim 1, wherein said query requesting ordering of data includes a Structured Query Language (SQL) query.

3. The method of claim 1, wherein ordering enforcement includes sorting.

4. The method of claim 1, wherein said required ordering enforcement operator includes a SORT operator.

5. The method of claim 1, further comprising:

converting the query into a tree of logical operators.

6. The method of claim 5, wherein said step of converting the query into a tree of logical operators includes determining orderings of data required by the query.

7. The method of claim 1, further comprising:

generating a query execution plan based upon combining said particular plan fragments covering all tables from which the query requests data.

8. The method of claim 1, further comprising:

generating a tree of physical operators based upon combining said particular plan fragments.

9. The method of claim 1, further comprising:

pruning plan fragments not having the lowest execution costs from each class.

10. The method of claim 1, further comprising:

pruning plan fragments not having the lowest execution costs and not providing a needed ordering from each class.

11. The method of claim 1, wherein said step of adding any required ordering enforcement operator includes adding a grouping and ordering enforcement operator to said particular plan fragment if grouping and ordering are needed at a class.

12. The method of claim 1, wherein said step of adding any required ordering enforcement operator includes adding the strongest available enforcement operator.

13. The method of claim 1, wherein said step of adding any required ordering enforcement operator includes determining whether said required ordering is already provided by said particular plan fragment.

14. The method of claim 1, wherein said step of adding any required ordering enforcement operator includes adding a set ordering enforcement operator for use during optimization of the query.

15. The method of claim 1, wherein said set ordering operator is subsequently converted into an appropriate physical operator required by the query.

16. The method of claim 1, wherein said step of generating plan fragments for obtaining data requested by the query includes using a depth-first, bottom-up search engine.

17. A computer-readable medium having computer-executable instructions for performing the method of claim 1.

18. A downloadable set of computer-executable instructions for performing the method of claim 1.

19. In a database system, a method for eager and opportunistic property enforcement enabling improved query optimization, the method comprising:

receiving a query requesting data from a database, said query requesting ordering and grouping of data;

generating plan fragments for obtaining data requested by the query;

grouping said plan fragments into classes based upon tables covered by each plan fragment;

if grouping is needed at a given class, adding a grouping enforcement operator to plan fragments in the given class having an ordering on the grouping columns;

for each class, determining a particular plan fragment having the lowest execution costs; and adding any required ordering enforcement operator to said particular plan fragment.

20. The method of claim 19, wherein said query includes a SQL query.

21. The method of claim 19, wherein ordering enforcement includes sorting.

22. The method of claim 19, further comprising:
converting the query into a tree of logical operators.

23. The method of claim 22, wherein said step of converting the query into a tree of logical operators includes determining groupings and orderings required by the query.

24. The method of claim 19, further comprising:
generating a query execution plan based upon combining said particular plan fragments covering all tables from which the query requests data.

25. The method of claim 18, further comprising:
generating a tree of physical operators based upon combining said particular plan fragments.

26. The method of claim 19, further comprising:
pruning plan fragments not having the lowest execution costs from each class.

27. The method of claim 19, further comprising:
pruning plan fragments not having the lowest execution costs and not providing a needed property from each class.

28. The method of claim 27, further comprising:
retaining a plan fragment providing a needed property if no other plan fragment with lower execution costs provides the needed property.

29. The method of claim 19, wherein said step of adding a grouping enforcement operator includes adding a GROUP ORDERED operator.

30. The method of claim 19, wherein said step of adding any required ordering enforcement operator includes determining whether said required ordering is already provided by said particular plan fragment.

31. The method of claim 19, wherein said step of adding any required ordering enforcement operator includes the substeps of:

determining whether grouping is also needed at the class;

if grouping is needed, adding an operator enforcing grouping and ordering to said plan fragment.

32. The method of claim 19, further comprising:

when adding an operator enforcing ordering to a plan fragment, determining whether grouping is needed at the class;

if grouping is needed, adding an operator enforcing grouping and ordering to said plan fragment instead of an operator enforcing ordering.

33. A computer-readable medium having computer-executable instructions for performing the method of claim 19.

34. A downloadable set of computer-executable instructions for performing the method of claim 19.

35. In a database system, a method for ordering and grouping enforcement enabling improved query optimization, the method comprising:

receiving a query requesting data from a database, said query requesting ordering and grouping of data;

generating sub-plans for obtaining data requested by the query, each said sub-plan comprising a portion of an overall query execution plan;

organizing said sub-plans into classes based upon tables covered by each sub-plan;

for each class, determining a particular sub-plan having the lowest execution costs;

if grouping is not required at a given class, adding an operator enforcing ordering to said particular sub-plan; and if grouping is required at a given class, adding an operator enforcing grouping and ordering to said particular sub-plan.

36. The method of claim 35, wherein said operator enforcing grouping and ordering comprises a GROUP SORTING operator.

37. The method of claim 35, wherein said operator enforcing ordering comprises a SORT operator.

38. The method of claim 35, further comprising:
generating a tree of physical operators based upon combining said particular sub-plans.

39. The method of claim 35, further comprising:
pruning sub-plans not having the lowest execution costs from each class.

40. The method of claim 35, further comprising:
pruning sub-plans not having the lowest execution costs and not providing a needed property from each class.

41. The method of claim 35, further comprising:
generating a query execution plan based upon combining said particular sub-plans covering all tables from which the query requests data.

42. A computer-readable medium having computer-executable instructions for performing the method of claim 35.

43. A downloadable set of computer-executable instructions for performing the method of claim 35.

* * * * *